United States Patent [19]
Read et al.

[11] Patent Number: 4,885,739
[45] Date of Patent: Dec. 5, 1989

[54] INTERPROCESSOR SWITCHING NETWORK

[75] Inventors: Edgar L. Read, Plano; Elwyn E. Grant, Richardson; Gary A. Keto, Rowlett; Sharlene C. Lin, Dallas; James D. Morgan, Garland; Robert E. Nimon, Arlington; Oliver G. Oldham, Garland; Allen R. Adams, Jr.; Jose A. Salmones, both of Plano, all of Tex.

[73] Assignee: DSC Communications Corporation, Plano, Tex.

[21] Appl. No.: 120,411

[22] Filed: Nov. 13, 1987

[51] Int. Cl.[4] .......................................... H04Q 11/04
[52] U.S. Cl. .................................. 370/58.1; 340/825.5
[58] Field of Search .................... 370/60, 58, 94, 85, 370/89, 62; 178/3; 340/825.5, 825.51

[56] References Cited

U.S. PATENT DOCUMENTS

| | | |
|---|---|---|
| 3,226,687 | 12/1965 | Amdahl et al. . |
| 3,226,688 | 12/1965 | Amdahl et al. . |
| 3,226,689 | 12/1965 | Amdahl et al. . |
| 3,226,692 | 12/1965 | Fuller et al. . |
| 3,274,561 | 9/1966 | Hallman et al. . |
| 3,411,139 | 11/1968 | Lynch et al. . |
| 3,419,849 | 12/1968 | Anderson et al. . |
| 3,651,473 | 3/1972 | Faber . |
| 3,749,845 | 7/1973 | Fraser . |
| 3,753,234 | 8/1973 | Gilbert et al. . |
| 3,768,074 | 10/1973 | Sharp et al. . |
| 3,787,816 | 1/1974 | Hauck et al. . |
| 3,876,987 | 4/1975 | Dalton et al. . |
| 3,905,023 | 9/1975 | Perpiglia . |
| 3,916,380 | 10/1975 | Fletcher et al. . |
| 3,984,819 | 10/1976 | Anderson . |
| 4,044,333 | 8/1977 | Auspurg et al. . |
| 4,075,693 | 2/1978 | Fox et al. . |
| 4,099,233 | 7/1978 | Barbagelata et al. . |
| 4,130,865 | 12/1978 | Heart et al. . |
| 4,155,117 | 5/1979 | Mitchell, Jr. et al. . |
| 4,166,929 | 9/1979 | Sheinbein ............................. 379/209 |
| 4,191,941 | 3/1980 | Springer et al. . |
| 4,195,344 | 3/1980 | Yamazaki . |
| 4,204,251 | 5/1980 | Brudevold . |
| 4,387,441 | 6/1983 | Kocol et al. . |
| 4,433,376 | 2/1984 | Lombardo, Jr. et al. . |
| 4,438,494 | 3/1984 | Budde et al. . |
| 4,482,996 | 11/1984 | Wilson et al. . |
| 4,516,238 | 5/1985 | Huang et al. . |
| 4,550,402 | 10/1985 | Gable et al. . |
| 4,598,400 | 7/1986 | Hillis . |
| 4,611,322 | 9/1986 | Larson et al. ......................... 370/60 |
| 4,630,258 | 12/1986 | McMillen et al. ..................... 370/60 |
| 4,698,841 | 10/1987 | Haselton et al. ...................... 370/60 |

OTHER PUBLICATIONS

"Butterfly Parallel Processing Computer", *Bolt Beranek and Newman, Inc.*, brochure, undated.

*Primary Examiner*—Douglas W. Olms
*Attorney, Agent, or Firm*—Baker, Mills & Glast

[57] ABSTRACT

A message transport network (10) is provided for high speed switching between processing elements (72, 80). Clusters of low speed processing elements (72) may be connected to the message transport network (10) through a transport node controller (78). The transport node controller (78) and the high speed processors (80) are connected to the gateways (82). A pair of gateways (82) may be connected through a transport interchange node (106) to allow communication between processors (72, 80) associated with the gateways (82). A transport interchange supervisor (98) maintains a record of the status of each gateway (82) and generates commands to form connection between gateways (82) in the transport interchange node (106). A maintenance controller (102) and system maintenance processor (76) oversee the validity of the data being passed through the system on paths independent of the data transfer paths. The message transport network (10) may be used in a variety of applications, such as a telphony switch (11), a signaling transfer point system (21) or a fault tolerant minicomputer (49).

30 Claims, 17 Drawing Sheets

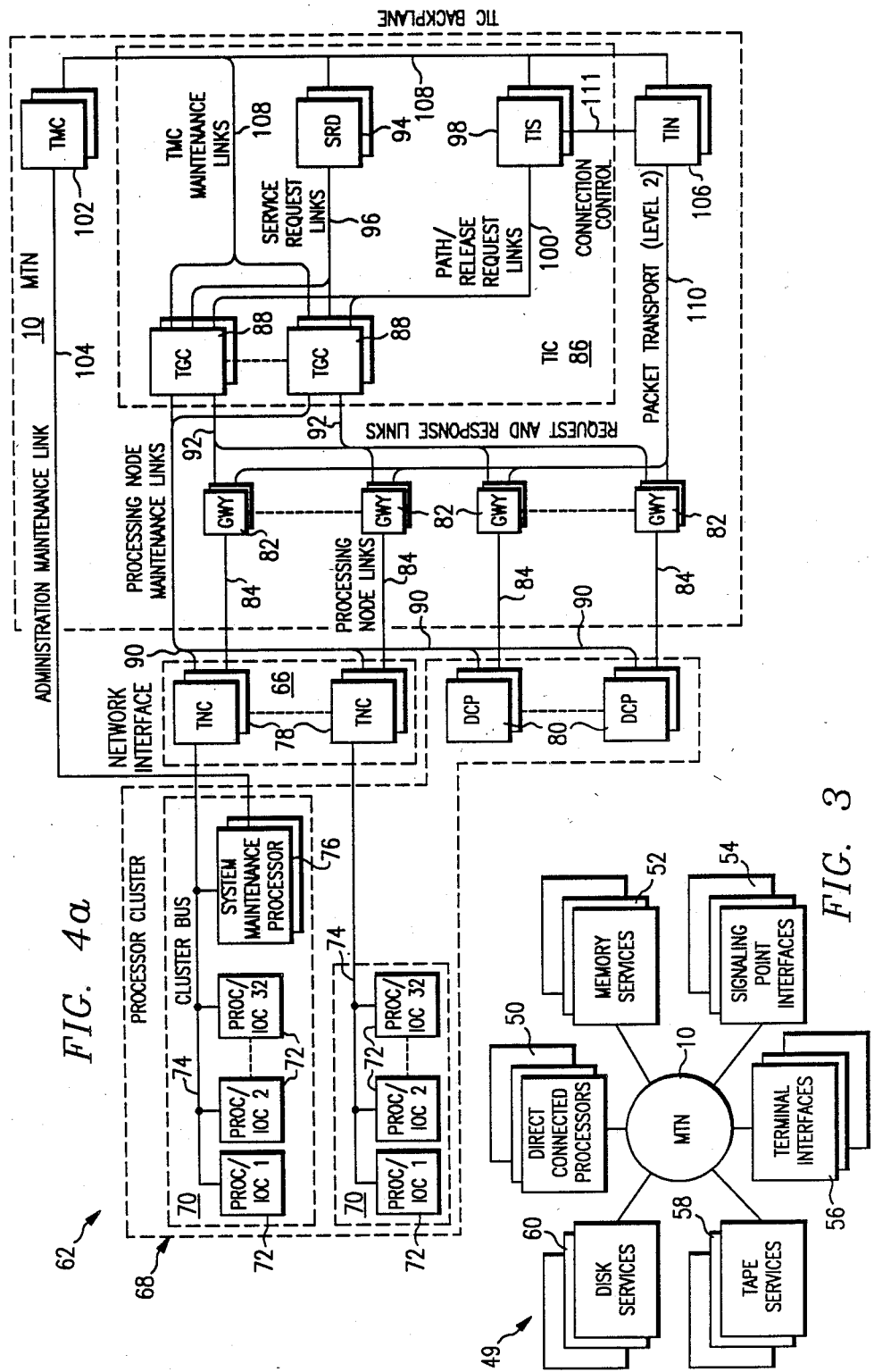

FIG. 12

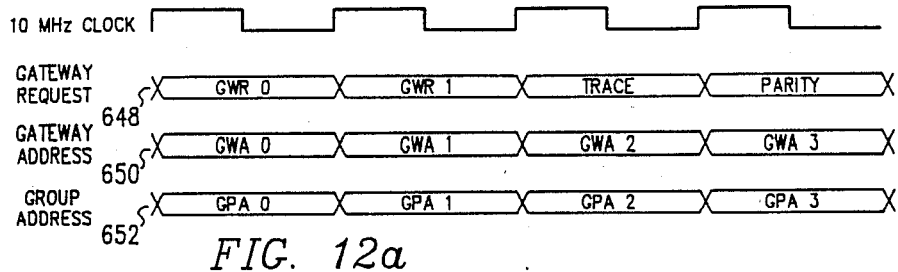
FIG. 12a
FIG. 12b
| REQUEST CODE | | FUNCTION |
|---|---|---|
| GWR 0 | GWR 1 | |
| 0 | 0 | SERVICE REQUEST |
| 0 | 1 | PATH REQUEST |
| 1 | 0 | RELEASE REQUEST |
| 1 | 1 | IDLE |
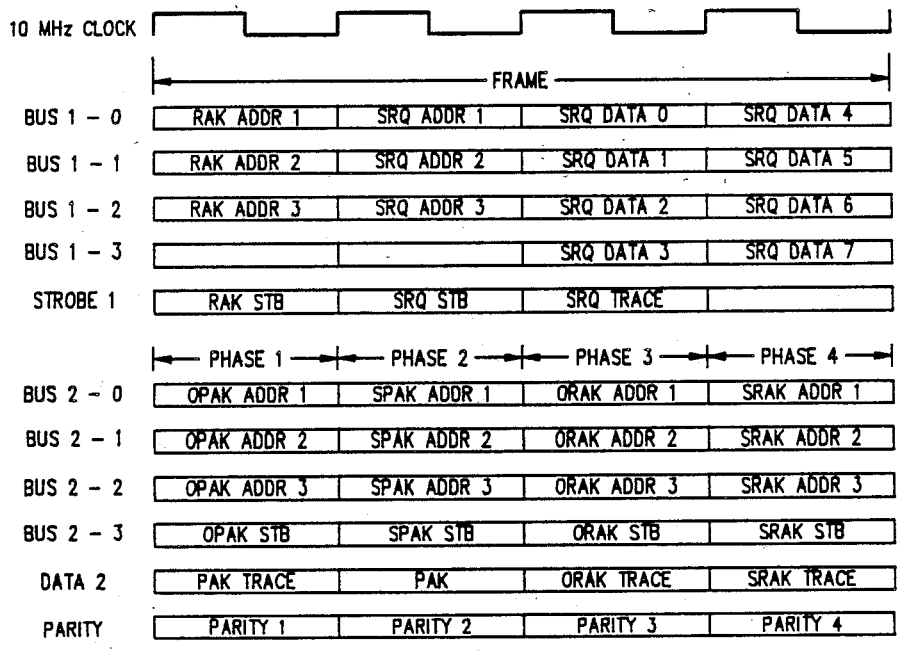
FIG. 12c

__4,885,739__

INTERPROCESSOR SWITCHING NETWORK

TECHNICAL FIELD OF THE INVENTION

This invention pertains in general to switching networks, and more, particularly to a method and apparatus for providing high speed packet switching between a plurality of processing elements.

BACKGROUND OF THE INVENTION

The integrated services digital network (ISDN) and its associated message oriented signaling protocols place new and demanding requirements on core switching technologies. In order to meet the ISDN specification, an efficient method of interconnecting a large number of high performance processors in a distributed processing system must be provided.

Previously developed systems suffered from a variety of inadequacies. First, the number of simultaneous connections between processing elements is limited, and the rate at which connections may be achieved is unsuitable, particularly for future applications. Preferably, up to thirty-two simultaneous connections would be supported, with a maximum connection rate approaching 2.5 million connections per second.

Further, present day systems do not offer flexibility in optimizing the cost of the system versus the failsafe mechanisms for overcoming partial system failures. Because the amount of system redundancy will vary depending on the application in which the switching network is used, it is beneficial that the switching network allow for selective redundancy for providing high availability in the most important subsystems.

Additionally, present day switching networks do not allow for cost effective growth capabilities, but rather, force the user to buy a new switching network to accommodate system expansion. Thus, present day switching networks do not offer both short and long term cost effectiveness for growing companies.

Another important aspect of switching networks is their ability to isolate and detect faults. In the telecommunications area, it is important to detect and isolate errors so that faulty data does not propagate through to other processing systems.

Thus, a need has arisen for a switching network capable of a large number of simultaneous connections and a fast connection rate, which offers high system availability and growth possibilities. Furthermore, the switching network system should have an effective means for detecting and isolating system faults and taking corrective measures.

SUMMARY OF THE INVENTION

For a more complete understanding of the present invention, a switching network method and apparatus is provided which substantially eliminates or prevents the disadvantages and problems associated with prior switching networks.

The switching network of the present invention selectively creates multiple paths between processing nodes to which a processor or a plurality of processors is attached. The switching network includes a gateway subsystem attached to each processing node. The gateway subsystems may be in either an "originator" or a "server" mode. The gateway is in an originator mode when, the processor to which it is attached is requesting service. The gateway is in an server mode when it is attached to a processor to which a connection has been requested by an originator gateway. Originator gateways forward requests for a connection (request for service) from a processor to which it is connected to a transport group controller subsystem which is connected to a predetermined group of gateway subsystems. The server gateway receives requests for service from its transport group controller, and initiates path requests upon receiving a service request. The server gateway also issues release requests in response to a release command from the associated processing node once a connection has been set up and the desired data transfer has terminated. Each gateway is responsible for buffering service requests from the processing node to which it is attached and from other originator gateways.

The transport group controller acts as an interface between a group of gateways to which it is attached and other subsystems in the switching network. The transport group controller acts as a funnel for requests issued by the gateways such that only one request from the gateway group associated with the transport group controller is forwarded to each of three dedicated buses during a request cycle. Since service, release and path request each have a dedicated bus, the TGC may forward one of each request type from its associated gateways during a given cycle.

A service request distributor accepts service requests from any of the transport group controllers and reformats the request and transmits it to the server TGC for transfer to the server gateway. A transport interchange supervisor subsystem receives path requests from the server gate via its associated transport group controller subsystem. The transport interchange supervisor is responsible for maintaining a record of the status (busy or idle) of all the gateways. If either the originating gateway or serving gateway are busy, the transport interchange supervisor subsystem initiates a negative acknowledgment to the serving and originating gateways and the serving gateway places the path request at the bottom of its path request fifo for later execution. On the other hand, if both the originating and serving gateway are idle, the transport interchange supervisor subsystem updates the status of the originating gateway and serving gateway as busy and sets up a two way connection between the two gateways in a transport interchange subsystem. The transport interchange supervisor subsystem subsequently initiates acknowledge signals to both the originator and server gateways.

Once a connection between gateways through the transport interchange subsystem is established, the processors may communicate through the connection. Once the communication is completed, the serving processor initiates a release request through the server gateway and server transport group controller to the transport interchange supervisor. In response, the transport interchange supervisor updates the status of the originator and server gateways as being idle.

In another embodiment of the present invention, a plurality of low speed processors are attached to a transport node controller. The transport node controller communicates with a number of processors in order to allow a single processing node to support more than one processor. The transport node controller may provide a path between processors associated with it.

In yet another embodiment, the switching network includes a transport maintenance controller which oversees the integrity of the data communicated through the switching network. The transport maintenance controller operates independently of paths used for creating connections, thereby maintaining the switching network without interfering with the speed of which connections are formed. Each subsystem contains maintenance buffers through which the necessary information is communicated.

In yet a further embodiment of the present invention, a system of "timing islands" is provided such that high speed data transfer can be reliably effectuated. The timing islands provide levels at which the clocks are synchronized with the data, in order to prevent skewing between the timing used by various subsystems.

BRIEF DESCRIPTION OF THE DRAWINGS

For a complete understanding of the present invention and the advantages thereof, reference is now made to the following descriptions taken in conjunction with the accompanying drawings in which:

FIG. 3 illustrates a block diagram of the message transport network of the present invention used in a fault tolerant super minicomputer application;

FIG. 4a illustrates a block diagram of the message transport network of the present invention connecting a plurality of high and low speed processing elements;

FIG. 8 illustrates a block diagram of the request interface section of the gateway subsystem;

FIG. 12 illustrates a block diagram of the transport group controller subsystem;

FIG. 12a-b illustrates a timing diagram and chart of the signals received by the transport group controller subsystem over the request bus;

FIG. 12c illustrates a timing diagram of the signals transmitted by the transport group controller subsystem on the response bus;

DETAILED DESCRIPTION OF THE INVENTION

The preferred embodiment of the present invention is best understood by referring to FIGS. 1-18 of the drawings, like numerals being used for like and corresponding parts of the various drawings.

APPLICATIONS OF THE MESSAGE TRANSPORT NETWORK

Figures 1, 2:
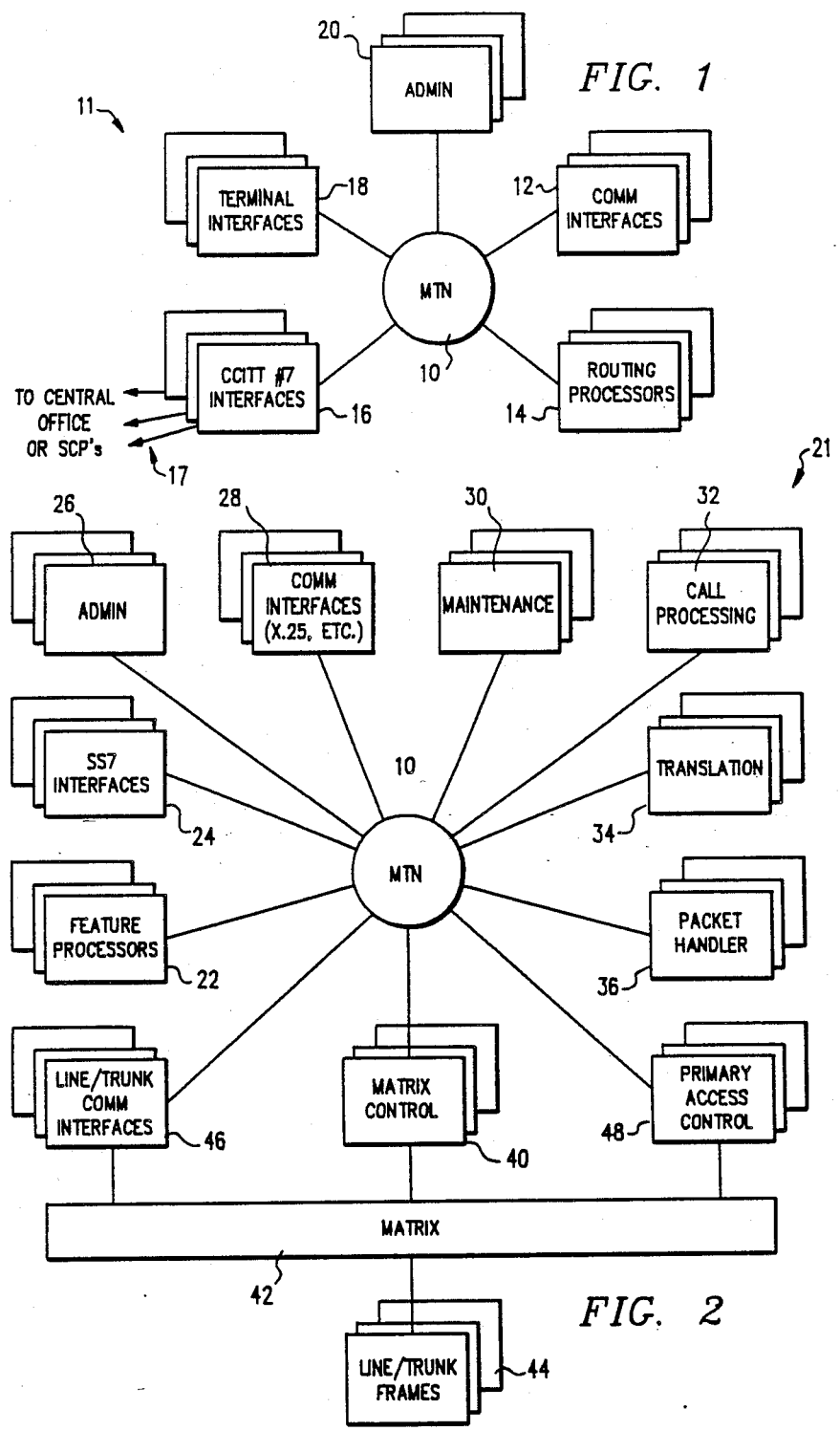
FIG. 1 illustrates a block diagram of the message transport network of the present invention used in a signaling transfer point application.
FIG. 2 illustrates a block diagram of the message transport network of the present invention used in a telephony switch control system.

FIGS. 1-3 describe typical applications in which the present invention may be used. FIG. 1 illustrates the switching network or "message transport network" of the present invention (hereinafter "MTN") being used in a signaling transfer point (STP) application. In this embodiment, the MTN 10 is connected to a plurality of data sources in order to implement STP 11. The data sources include communications interfaces 12, routing processors 14, CCITT #7 interfaces 16 connected to outside lines 17, terminal interfaces 18, and administrative block 20.

In operation, the communication interfaces 12 comprise packet network equipment used for data transfer, such as X.25 communication equipment. The routing processors 14 look at headers included in the data blocks of the CCITT #7 messages transferred through the CCITT interface 16. The CCITT interface 16 receives messages from outside lines 17 and transmits messages which have been processed by the routing processors to outside lines 17. The terminal interfaces 18 include control terminals, printers, and asynchronous terminals. The administration block 20 includes the system administrator programs which perform system configuration, program loads, performance measuring and maintenance routines on the system.

As common channel signalling (CCS) becomes more prevalent in switching networks, the message throughput requirements for signalling transfer point (STP) systems 11 will stress the capabilities of traditional system architectures. The capacity, availability, and growth characteristics of the MTN 10, described below, facilities the implementation and expansion of STP systems. Using an MTN 10, a STP system 11 can accommodate in excess of seven hundred, fifty-six kilobit per second links.

FIG. 2 illustrates use of the MTN 10 as part of a telephony switch control system 21. In this embodiment, the MTN 10 is connected to feature processors 22, SS7 interfaces 24, administrative support equipment 26, communication interfaces 28, maintenance processors 30, call processing equipment 32, translation equipment 34, and packet handlers 36. Further, the MTN 10 is connected to a matrix control circuit 40 which interfaces the MTN 10 to a matrix 42. Line/trunk frames 44 are connected to the matrix 42 and the line/trunk communication interfaces 46 and primary access control circuits 48 are connected between the MTN 10 and the matrix 42.

In operation, the telephony switch control system 21 provides a voice and data communication central office.

The feature processors 22 provide telephony switch features such as operator services. The SS7 interfaces 24 provide an interface with signalling transfer points for communicating with other network elements. The administration support equipment 26 includes system administration services, as described above in connection with FIG. 1. The communication interfaces provide an interface with data packet protocols such as X.25. The maintenance processor 30 provides system maintenance services. The call processing processor 32 invokes procedures which perform call routing, primarily in connection with voice or data communications. The translation processor 34 provides translation of incoming directory numbers received from the line/trunk frames 44. The packet handler 36 interfaces into a packet network for data transfers, such as X.25 packets.

The primary access control provides the ISDN interface for primary rate, i.e., T1, signalling. The matrix 42, under the control of the matrix control circuit 40, connects inbound lines to outbound lines. The line/trunk communication interfaces 46 provides the access to line/trunk processors in the line/trunk frames. Line/trunk processors provide the first level of supervision of the line and trunk frames. For example, the line/trunk processors in the line/trunk frames 44 oversee off-hook and on-hook conditions and report status changes to the line/trunk communication interfaces 46.

The processor blocks 22-46 are connected through the MTN 10 to provide a fast communication network to allow fast connections between the processors.

Many of the functions indicated above require high message throughput for high traffic switches. As described herein below, the MTN 10 provides an efficient message transport mechanism required for large, feature-rich switches. The growth in processing power required as features and capacity are added to an installed telephony switch can be accommodated in a cost effective manner with the present invention.

FIG. 3 illustrates the MTN 10 in an application as a fault tolerant super minicomputer 49. In this application, the MTN 10 is connected to direct connected processors 50, memory services 52, signaling point interfaces 54, terminal interfaces 56, tape services 58, and disk services 60.

In operation, the data processing system 49 connects plurality of processing services through the MTN 10. The direct connected processors 50 comprise stand-along computer terminals or multiuser computers. The memory services 52 comprise a fast electronic memory, while disk services 60 and tape services 58 provide non-volatile mass-memory. Terminal interfaces 56 provide terminals for interface with the direct connected processors 50. The signaling point interfaces 54 allows an interface into the CCITT #7 interfaces illustrated in FIG. 1.

Multiprocessor systems typically suffer performance degradation due to bus congestion and limited memory capacity. A distributive multiprocessor architecture based around the MTN avoids these pitfalls.

Directly connected processing elements 50 can be attached to the MTN 10 in a loosely coupled star arrangement. Processing capacity, I/O, and memory modules can be easily configured in a modular fashion and tailored specifically for a particular application.

MTN System Overview

Referring to FIG. 4a, an overview of a MTN application is illustrated. The processing system 62, which may be an application described in FIGS. 1-3, or another application using high speed message switching, comprises the message transport network switch, denoted generally by reference numeral 10, a network interface section 66 of the MTN 10, and a processor section 68.

The processor section 68 comprises processor clusters 70 in which a plurality of relatively low speed processing elements 72 are connected to a cluster bus 74 which is connected to the network interface 66. Also included in the processor section is a system maintenance processor 76 used for fault isolation in the processing system 62. The system maintenance processor 76 is connected to one of the clusters buses 74, preferably the first cluster bus.

In the illustrated embodiment, each cluster bus 74 handles up to thirty-two processing elements 72 (hereinafter "cluster processors" 72), including the system maintenance processors 76. However, the present invention would be able to accommodate more or less processors depending upon the speed of the processors 72 relative to the speed of the network interface section 66.

The processor section 68 further comprises direct connected processors (DCP) 80 which are directly connected to the MTN 10, as opposed to low speed processing elements 72 which are connected to the MTN 10 through the network interface section 66. The DCPs 80 are generally high speed processing elements which cannot be effectively multiplexed on a single bus without degrading their performance.

The network interface 66 comprises transport node controllers (TNCs) 78 connected to the cluster bus 74. In the preferred embodiment, two TNCs 78 are connected to each cluster bus 74 to provide complete redundancy in the event that one TNC 78 fails.

The MTN 10 also comprises gateways (GWYs) 82 which are connected to the TNCs 78 and the DCPs 80 over processing node links 84. The point at which GWYs 82 are connected to the DCPs 80 or TNCs 78 is referred to as a "processing node." Each GWY, TNC, and DCP, is connected to a transport interchange control subsystem (TIC), generally noted by reference number 86. The TIC 86 comprises a plurality of transport group controllers (TGC) 88, which are connected to the TNC 78 and DCPs 80 over processing node maintenance links 90 and to the GWYs 82 over request and response links 92. The TGCs 88 are connected to a service request distributor (SRD) 94 over a service request link 96. The TGC 88 is also connected to a transport interchange supervisor (TIS) 98 over path/release request links 100 comprising path request links 100a and release request links 100b.

A transport maintenance controller (TMC) 102 is connected to the system maintenance processor 76 over an administration maintenance link 104. The TGCs 88, SRD 94, TIS 98, and a transport interchange (TIN) 106 are connected to the TMC 102 over a TMC maintenance link 108. The GWYs 82 are connected to the TIN 106 over a packet transport link 110. The TIS 98 is connected to the TIN 106 by a connection control bus 111.

In operation, the MTN 10 provides high speed communication links between processing elements 72 and 80 connected to the MTN 10 through the GWYs 82. The processors 72 and 80 perform tasks such as illustrated in FIGS. 1-3 above. Thus, as an example, one or more low speed processing elements 72 may be used to implement the CCITT #7 interfaces 16 of the STP 11 illustrated in FIG. 1. The CCITT #7 interfaces 16 would allow communication between any two #7 links 17 of the STP 11 through the MTN 10, allowing high speed data transfers.

Figure 4B:
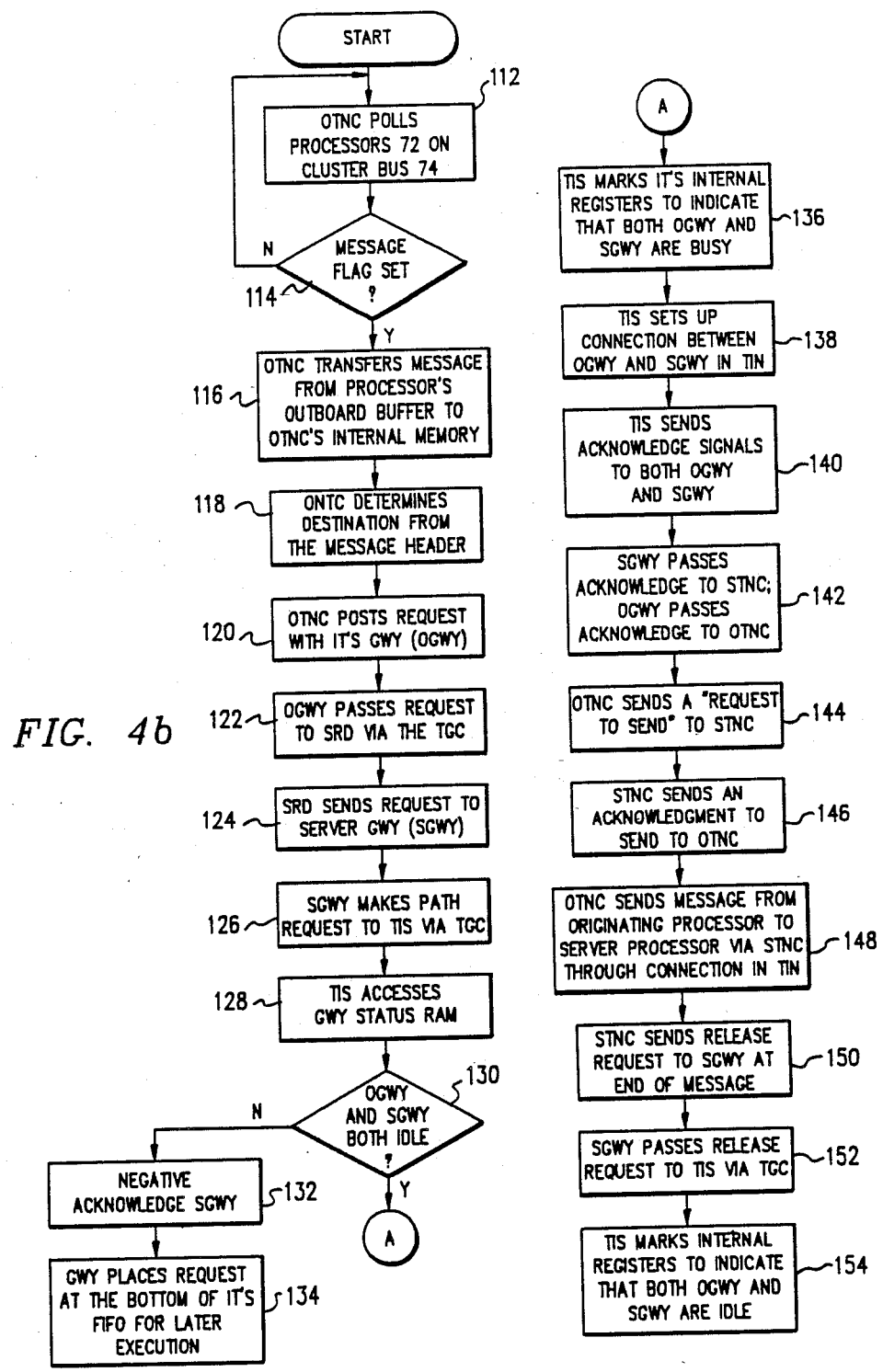
FIG. 4b illustrates a flow chart describing the creation of typical communication link between processing elements.

The operation of the MTN 10 is best illustrated by reference to FIG. 4b, which illustrates a flow chart of the formation and release of a typical communication link between processing elements. In the flow chart of FIG. 4b, an originating processor 72 on one of the cluster buses 74 desires to communicate with a processor 72 on another cluster bus 74. For purposes of this application, "originating" denotes the subsystems (TNC, GWY, TGC) of the system 62 which are associated with the processor initiating the request and "server" denotes the subsystems associated with the processor with which a connection is desired. Since each subsystem may be associated with a plurality of processors, a subsystem may be both an originating and a server subsystem in a given connection.

In block 112, the originating TNC 78 (OTNC) polls the processors 72 on its cluster bus 74 to determine whether any of the processors 72 are requesting action by the OTNC. The OTNC continues to poll the processor 72 until it finds a processor 72 having its message flag set, as indicated by decision block 114. In block 116, after the OTNC has detected a set message flag in one of the processors, the OTNC transfers the message from the originating processor's outbound buffer to the OTNC's internal memory. Each processor 72 has dedicated inbound and outbound buffers for storing flags, messages, and data; similarly, each TNC 78 has buffers individually dedicated for each processor on its cluster bus 74. Thus, in block 116, the message from the originating processor is stored in the memory of the OTNC dedicated to that processor.

In block 118, the OTNC determines the desired destination processor ("server" processor) from the message header. In block 120, the OTNC posts a service request with its associated GWY (OGWY) indicating that it requests link between the originating and server processor. In block 122, the OGWY passes the request from the OTNC to the SRD 94 via the OTGC 88 associated with the OGWY. In block 124, the SRD 94 sends the request to a server GWY 82 (SGWY) which connects to the server TNC 78 (STNC) to which the desired server processor is connected. The request is stored in a fifo buffer in the SGWY. For clarity, requests being transferred from the originator TNC to the SRD 94 are "inbound" requests, and requests transferred from the SRD 94 to the server TNC are "outbound" requests.

In block 126, the SGWY accesses the request from its buffer when it reaches the top of the fifo, and makes a path request to the TIS 98 via its corresponding TGC 88 (STGC).

In block 128, the TIS 98 accesses any internal RAM memory (GWY Status RAM) to retrieve the busy/idle status of both SGWY and OGWY. In decision block 130, the TIS determines whether both the OGWY and SGWY are idle. If the OGWY and SGWY are not both idle, the TIS 98 sends a negative acknowledge to the SGWY in block 132. Subsequently, the SGWY 82 places the request at the bottom of its fifo for later execution in block 134.

If, however, both the OGWY and SGWY are idle, then, in block 136, the TIS 98 marks its GWY Status RAM to indicate that both the OGWY and SGWY are busy. In block 138, the TIS 98 sets up a connection between the OGWY and SGWY via the connection control bus 111. After the connection is performed, TIS sends acknowledge signals to both the OGWY and SGWY in block 140.

In block 142, the SGWY passes the acknowledge to the STNC and OGWY passes the acknowledge to the OTNC. The OTNC sends a "request to send" to the STNC in block 144 and the STNC sends an "acknowledge to send" to the OTNC in block 146.

In block 148, the OTNC sends the message from the originating processor to the server processor via the STNC through the connection setup in the TIN 106. After the message transfer is completed, the STNC sends a release request to the SGWY in block 150; the SGWY passes the release request to the TIS 98 via the STGC in block 152. In block 154, upon receiving the release request, the TIS 98 marks its internal registers to indicate that both the OGWY and SGWY are now idle, and ready for new connections.

Many elements of the MTN 10 are duplicated for complete redundancy in the case of an equipment failure. Preferably, the system maintenance processor 76, TNC 78, TMC 102, TGC 88, SRDs 94, TIS 98, TINs 106 and GWYs 82 are all implemented in duplex. For purposes of clarity, redundant pairs of boards will be referred to as a unit, i.e., TN 78 or TNC pair 78, while the individual boards will be referred to as "copies A or B", such as "TNC copy A".

Redundancy Configuration Alternatives

As illustrated, the MTN 10 is fully 2N redundant with cross-connects between all plane elements. The connections between the TGCs 88 and the gateways 82 are such that a duplex failure of a TGC pair 88 does not result in the loss of any communication. A simplex failure does not result in the loss of any other redundancy levels, i.e., a simplex failure of a TGC copy 88 does not affect the redundancy of a TNC pair 78. This protection is provided by the connections of cluster buses 74 to TNC 78 and connections between the GWY 82 and the TGCs 88. Since each of the cluster buses 74 is connected to two TNCs 78, and since each TNC 78 has access to a different pair of TGCs 88, all four of the TGCs 88 associated with a cluster would have to fail in order to eliminate an entire cluster. In the preferred embodiment, two TNCs 78 are connected to each cluster bus 74. Thus, a duplex failure of TNCs can eliminate an entire cluster. Redundancy could be improved by providing redundant processors in different clusters. However, this redundancy scheme would require additional hardware and a greater cost.

The TMC 102 is 2N redundant and provides the clock distribution functions along with the maintenance communication control functions for the MTN 10. At slightly more cost and complexity, two oscillators may be placed on each TMC copy 102 to provide greater redundancy in the timing distribution function.

In the MTN 10, communications between processing elements proceed on a number of levels. To aid in understanding, four levels of communication are summarized in Table 1.

TABLE 1

| Communication Levels | |
| --- | --- |
| Level 1 | Connection protocol for requesting the creation of links between processor and subsequent release therefrom |
| Level 2 | TNC to TNC protocol |
| Level 3 | Processor to Processor protocol |

TABLE 1-continued

| Communication Levels | |
|---|---|
| Level 4 | Maintenance function protocol for tracing, parity, timing and selection of redundant planes |

Transport Node Controllers

Figure 5:
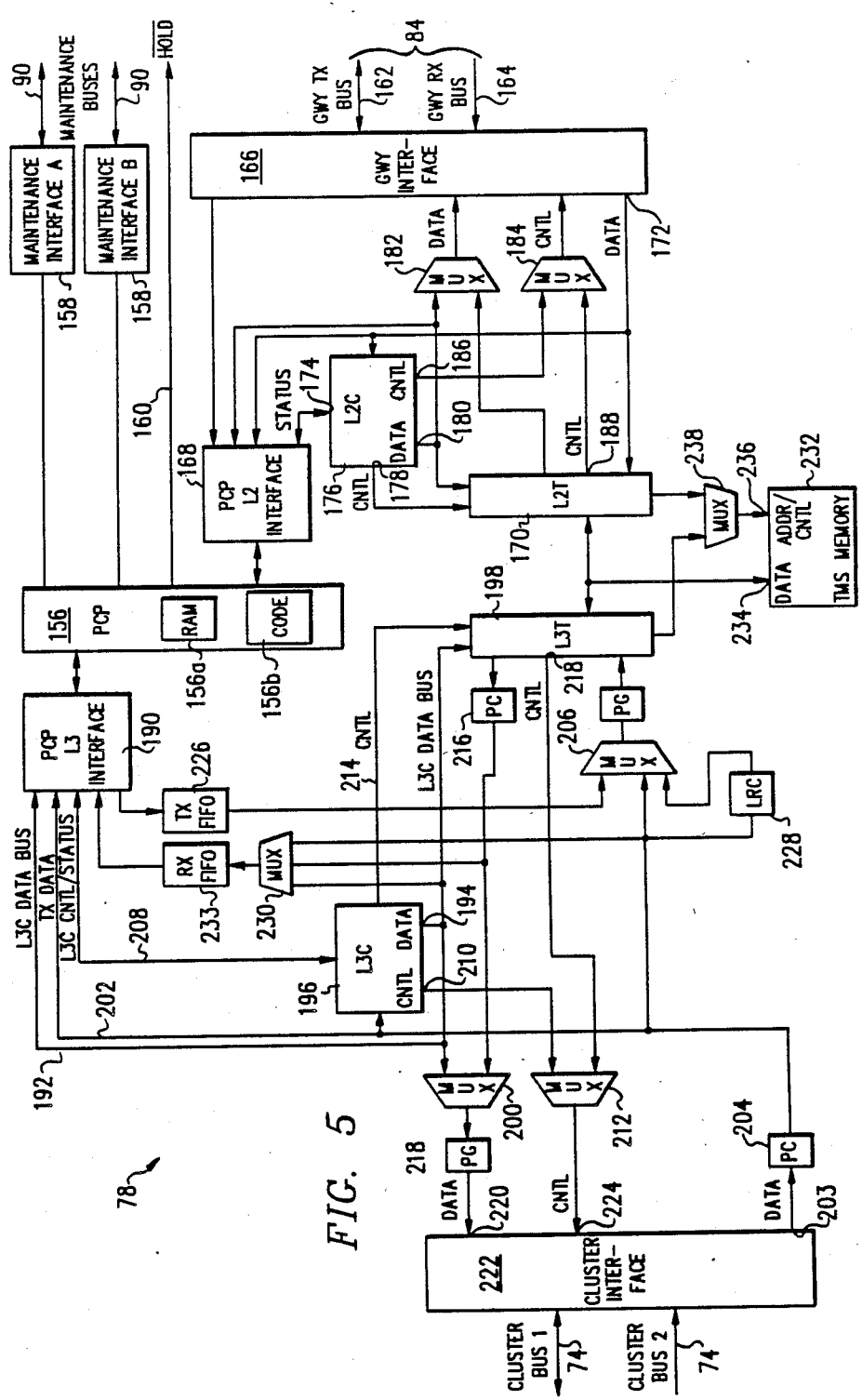
FIG. 5 illustrates a block diagram of the transport node controller subsystem of the present invention.

FIG. 5 illustrates a block diagram of the TNC 78. The TNC 78 comprises a packet control processor (PCP) 156 having an internal RAM memory 156a and code memory 156b connected to the processor node maintenance link 90 via maintenance interfaces 158. The PCP 156 is also connected to its associated GWY 82 by a hold signal line 160 which is part of the processing node links 84. The GWY transmit bus 162 and GWY receive bus 164 of the processing node links 84 are connected to a GWY interface 166. The GWY interface 166 is connected to a PCP level two interface 168 which is connected to the PCP 156. The PCP level two interface 168 is also connected to a level two transport 170 and to a data output 172 of the GWY interface 166. The PCP level two interface 168 is also connected to the status output 174 of a level two controller 176.

A first control output 178 is connected to the level two transport 170 and a data port 180 is connected to the level two transport 170. A first multiplexer 182 receives an input from a data output 180 of the level two controller 176 and from the level two transport 170. The output of the first multiplexer 182 is connected to the GWY interface 166. A second multiplexer 184 receives input from a control output 186 of the level two controller 176 and from an control output 188 of the level two transport 170. The second multiplexer 184 has an output connected to the GWY interface 166. The data port 172 of the GWY interface 166 is also connected to the level two transport 170.

The PCP 156 is also connected to a PCP level three interface 190. A level three controller data bus 192 connects the PCP level three interface 190 with the data port 194 of a level three controller 196, a level three transport 198 and to a third multiplexer 200. A TX data bus 202 connects the PCP level three interface to the level three controller, to a parity check 204 and to a fourth multiplexer 206. A level three controller control/status line 208 also connects the PCP level three interface 190 to the level three controller 196.

The level three controller 196 has a control port 210 which is connected to a fifth multiplexer 212. A control line 214 connects the level three controller 196 to the level three transport 198. The level three transport 198 is connected to a second parity check 216 which is connected to a second input of the third multiplexer 200. A control port 217 of the level three transport 198 is connected to a second input of the fifth multiplexer 212. The output of the third multiplexer 200 is connected to a first parity generator 218 which is connected to the data port 220 of the cluster interface 222. The output of the fifth multiplexer 212 is connected to the control port 224 of the cluster interface 222. The first parity check 204 is also connected to a data port 223 of the cluster interface 222. Two cluster buses 74 are connected to the cluster interface 222.

The second input to the fourth multiplexer 206 is received from a transmit fifo 226, which is also connected to the PCP level three interface 190. The output of a longitudinal redundancy code (LRC) generator 228 is connected to the third input of the fourth multiplexor.

The input to the LRC generator 228 is connected to the sixth multiplexer 230 and to the RX data bus 202. The sixth multiplexer 230 is also connected to the level three controller data bus 192 and to the second parity check 216. The output of the sixth multiplexer 230 is connected to a receive fifo 233 which is connected to the PCP level three interface 190.

The level two transport 170 is connected to the level three transport 198 and to a TMS memory 232 via a data port 234. The address/control port 236 is connected to a seventh multiplexer 238 whose inputs are connected to the level two transport 170 and to the level three transport 198.

In operation, the TNC 78 allows a plurality of processors 72 to be connected to as single GWY 82, thus providing efficient use of the GWYs 82. The TNC 78 communicates with the MTN 10 through the GWY 82. The TNC 78 is responsible for handling all message traffic between processors 72 to which it is connected, and for handling all message traffic to or from the processors 72 through the GWYs 82.

The level three subsystem comprising the level three controller 196, the level three transport 198, and the cluster bus interface 222 is responsible for the transfer of packet data between the TMS memory 232 and the processors 72. The level three controller 196 resembles a microprocessor in the way it may programmed to perform its tasks. The level three transport 198 is a DMA channel under control of the level three controller 196. The main function of the level three controller 196 is to poll cluster processors 72 and to prepare the level three transport 198 to transfer data to or from the processor 72 as indicated by the processor status. The level three controller 196 can communicate packet-level status information about these transfers to the PCP 156 through the fifo 233, and can interrupt the PCP 156 to signal task completion. The level three controller 196 and level three transport 198 are discussed in further detailed hereinbelow. The L3C also permits packet transfers between the TMS memory and the PCP via the L3T and the RX and TX fifos.

The level two subsystem is responsible for the transfer of packet data between the TMS memory 232 and the attached GWYs 82. The level two subsystem comprises the level two controller 176 and level two transport 170. The level two controller also resembles a microprocessor in that it may be programmed to perform its tasks; however, unlike the level three controller 196, the level two controller 176 is event-driven, and can best be viewed as a processor which executes only interrupt handlers. A stimulus received by the level two controller 176 from the GWY 82 or from the PCP 156 causes the level two controller to execute a specific handler for that stimulus. The level two controller 176 does not support any program branching or testing in the program code; the execution of a specific handler is done in response to a specific hardware event, and all branching and testing is done by the hardware. The main function of the level two controller 176 is to set up the level two transport 170 for packet data transfer in response to a sequence of events occurring on the TNC 78 and the GWY 82. The level two transport 170 then controls the transfer of data between the GWY 82 and the TMS memory 232. Packet-level status information is sent to the PCP 156 by the level two controller 176 through a number of status registers. The level two controller 176 can interrupt the PCP 156 by using an interrupt to signal events or tasks completion.

The level two controller 176 and level three controller 196 are controlled by the PCP 156 based upon the status information sent to the PCP 156 by the level two and three controllers 176 and 196. The PCP 156 determines what action should be taken based on the status information, for example, whether a message received from a cluster processor 72 is addressed to a processor which is part of the same cluster, and should therefore be sent back out to the cluster by the level three transport 198, or is addressed to a processor 72 in a cluster not connected to the particular TNC 78, and therefore must be sent through the MTN 10 using the level two transport 170. The PCP 156 is also responsible for managing buffer allocation within the TMS memory 232, and keeping track of the in-service/out-of-service status of its cluster processors 72.

The TMS memory 232 serves as a central storage location for packet data. Packets received by the TNC 78 are stored in the TMS memory 232 by the level three transport 198 and the level two transport 170.

The maintenance communication interface supports the level four protocol used to perform maintenance functions within the MTN 10. It is comprised of two full duplex, high speed, parallel communications channels with lifo buffers. These channels interface the PCP 156 to a redundant pair of TGCs 88, which are responsible for maintenance functions.

The PCP 156 is a high speed microprocessor; preferably, a Motorola 68020 processor is used to implemented the processing functions of the PCP 156. The PCP 156 contains internal storage memory 156a and code memory 156b. The PCP 156 is responsible for the initialization of all devices and subsystems of the TNC 78, for control of the level two controllers 176 and level three controllers 196, and for packet-level message routing and buffer management.

The level three controller 196 and level two controller 176 are RAM based state controllers. The controllers 176 and 196 use a dual-ported RAM such that they may be accessed by the PCP 156 through the PCP interfaces 168 and 190. In the preferred embodiment, the level two controller 176 and level three controller 196 each comprise a state controller and a dual-ported memory, which can be accessed by both the state controller and the PCP 156. The state controllers comprise sequential counting logic and decode logic to perform control functions and program jumps based on external criteria and the program stored in the control RAM.

The level two transport 170 and level three transport 198 are essentially DMA controllers. The level three transport 198 provides access to the TMS memory 232 by the receive fifo 233, transmit fifo 226, and cluster bus interface 222. The level two transport 170 provides data transfers between the TMS memory 232 and the GWY interface 166.

As previously discussed in connection with the flow chart of FIG. 4b, the TNCs 78 poll the processors 72 for messages, and transfer data between the processors 72 and the GWYs 82. The level three controller 196 initiates message transfers between the processors 72 and the TMS memory 232. The dual-ported RAM memory of the level three controller 196 is divided into sections dedicated to each of the processors 72 on the cluster bus 74 serviced by the TNC 78. The PCP 156 modifies the code in the level three controller 196 during operations depending on the status of each processor 72. For example, the level three controller 196 may be scanning some processors for messages, transferring data into some processors 72 and out of other processors 72 within the same execution cycle. Thus, the level three controller 196 executes the code for each processor 72 in a serial fashion, and the PCP 156 changes the code depending upon the activity resulting from the previous execution.

Operation of Originating TNC

For example, if a processor 72 has a flag set in its status buffer indicating that it desires to send an inbound message, the level three controller 196 detects the message flag during its scanning of the processors, and transfers the header from the processor 72 to the receive fifo 233 via the parity check 204 and the sixth multiplexer 230. In response to the header, the PCP 156 changes the control buffer in the level three controller RAM 196, such that on the next pass of the level three controller the data is transferred from the processor 72 into the TMS memory 232 via the level three transport 198. In order to effect the transfer, the level three controller 196 provides the level three transport 198 with an address in the TMS memory 232 and a byte count of the number of bytes to be transferred. The necessary enabling signals are sent to the fourth multiplexer 206 and to the level three controller 196 via the level three controller data bus 192 and the control line 214 to setup the data transfer path. The level three transport 198 generates the control signals necessary to transfer the data to the TMS memory 232.

After the data from a processor 72 has been stored in the TMS memory 232, the PCP 156 provides the code to the level two controller 176 to transfer the data from the TMS memory 232 to the GWY interface 166. The level two controller 176 operates in a manner similar to the level three controller 196. To transfer data from the TMS memory 232 to the GWY interface 166, the level two controller 176 initiates a transfer in the level two transport 170. The level two controller 176 sends the level two transport 170 an address pointer and a count of the number of bytes to be transferred, but does not execute the transfer until a connection through the MTN 10 has been provided. To initiate a connection in the MTN 10, the level two controller 176 sends a request to the GWY 82 via the GWY transmit bus 162 of the processing node link 84. After posting a request for service with its GWY 82, the TNC 78 waits for an originator path acknowledgement from the GWY. In response to the originator path acknowledgement, the L2C transmits a "request to send" message to the server TNC and waits for a "clear to send" message. Once the "clear to send" acknowledgment is received by the level two controller 176 from the serving TNC, the transfer of data which was previously setup, is executed through the level two transport 170.

Operation of Serving TNC

The serving TNC operates in a different manner. A "request to send" response block is maintained in the L2C 176 by the PCP 156 for each processor 72 associated with a TNC. If a processor 72 is in service and a receive buffer is available, the associated "request to send" response block contains the code necessary to set up the L2T 170 to receive a message from an originator TNC and the code to send a "clear to send" message to the originator TNC 78. When a connection is made between two TNCs, the server TNC receives a server path acknowledge from its gateway. The server path acknowledge causes the L2C to enter into the server mode in which it is waiting for a request to send but no action is initiated by the L2C. The request to send message contains the address of the processor 72 to which the associated packet is to be delivered and receiving the request to send message vectors the L2C to the "request to send" response block for the addressed processor. In response to the request to send, the L2C initializes the L2T to receive the packet and sends a clear to send message to the originator TNC. Once the packet is received, the PCP 156 of the server TNC codes the level two controller 176 such that a release command is sent to the TIS 98 via the serving GWY and its TGC 88.

The TNC 78 is designed to allow communication with the PCP 156 through a plurality of sources. The sixth multiplexer 230 selects between three inputs at which information for the PCP 156 may be stored. The first input to the multiplexer 230 is connected to the cluster interface 222 at the data output port 223. The second input to the multiplexer is connected to the level three transport 198. The third input to the multiplexer 230 is connected to the level three controller 196. This arrangement allows flexibility in communications with the PCP 156.

The transmit fifo memory 226 stores data from the PCP 156 for transfer to the TMS memory 232 through the level three transport 198. The transmit fifo 226 and receive fifo 233 isolate the timing of the PCP 156 from the timing of the level three transport 198 and level three controller 196.

Figure 6:
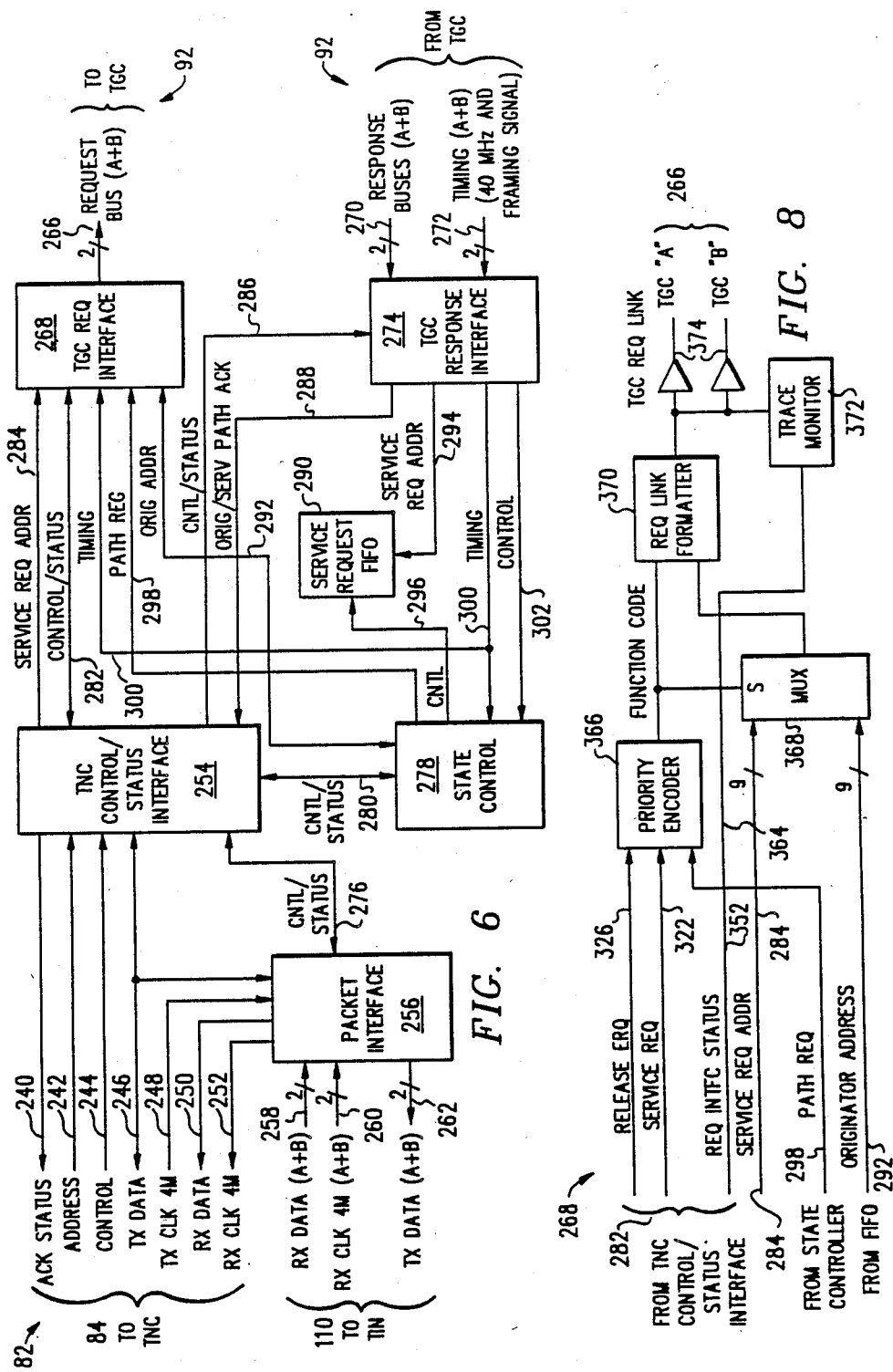
FIG. 6 illustrates a block diagram of the gateway subsystem of the present invention.

FIGS. 6-10 illustrate the GWY 82. FIG. 6 illustrates a block diagram of the GWY 82. The GWY 82 is connected to the TGC 88 via request and response links 92, and is connected to the TNC 78 via processing node links 84. The processing node links 84 include an acknowledge status line 240, an address line 242, a control line 244, a transmit data line 246, a transmit 4 MHz clock line 248, a receive data line 250, and a receive 4 MHz clock line 252. The acknowledge status line 240, address line 242, and control line 244 are connected to a TNC control/status interface (hereinafter "TNC interface") 254. The transmit data line 246 is connected to the TNC interface 254 and to a packet interface 256. The transmit 4 MHz clock line 248, receive data line 250, and receive 4 MHz clock line 252 are also connected to the packet interface 256.

The packet interface 256 also receives clock signals from the TIN 106 over the packet transport link 110. The lines of the packet transport link 110 which are connected to the gateway 82 include receive data lines 258, receive 40 MHz clock lines 260, and transmit data line 262. Each of the lines 258-262 of the packet transport link 110 are connected to both A and B copies of the TIN 106.

The gateway 82 is connected to the TGC over request and response links 92. The request and response links 92 include a request bus 266 connected to a TGC request interface 268 and response buses 270 and timing buses 272 connected to a response interface 274. The buses from the request and response links 92 are connected to both A and B copies of the TGC 88 to which the gateway 82 is associated.

The TNC interface 254 is connected to the packet interface 256 via a control/status line 276. The TNC interface 254 is connected to a state controller 278 by a control/status line 280. The TNC interface 254 is also connected to the request interface 268 by a control/status line 282 and a service request address 284. The TNC interface 254 is connected to the TGC response interface 274 by a control/status line 286 and by a originating/server path acknowledge line 288.

A service request fifo 290 is connected to the TGC request interface 268 and to the state controller 278 by a originator address line 292. The service request fifo 290 is also connected to the response interface 274 via a service request address line 294 and to the state controller 278 via a control line 296.

The state controller 278 is connected to the TGC request interface 268 via a path request line 298 and to the response interface 274 via a timing line 300 and a control line 302. The request interface 268 is connected to the response interface 274 by the timing line 300. The TNC status interface 254 provides access to the gateway 82 by the associated TNC 78 for controlling and monitoring the functions on the card. The TNC interface 254 is shown in greater detail in connection with FIG. 7. The TGC request interface 268 provides access to a redundant pair of TGCs 88 for initiating service request, path request and release request. The TGC request interface 268 is described in greater detail in connection with FIG. 8.

The TGC response interface receives and interprets request acknowledgments and outbound service requests transmitted through the TGCs 88 by the TIS 98 and SRD 94. The TGC response interface 274 is described in greater detail in connection with FIG. 9.

The gateway state controller manages the writing and reading of data stored in the service request fifo 290 and initiates path requests based on signals received from the TGC response interface 274 and the TNC interface 254. The state controller 278 is described in greater detail in connection with FIG. 10a.

The packet interface 256 provides format conversion for packet data transmitted between TNCs 78 and the TIN 106. Packet data transmitted between the TNC 78 and the gateways 82 is transmitted on ten bit parallel buses operating at 4 MHz. Packet data transmitted between the gateways 82 and the TIN 106 is transmitted on serial highways operating at 40 MHz. The packet interface 256 is described in greater detail in connection with FIG. 10b.

In operation, the GWY 82 provides the TNC 78 and DCPs 80 access to the MTN 10 via the processing node links 84. The GWYs 82 access the TGCs 88 via the request and response link 92. The GWYs 82 access the TIN 106 via the packet transport bus 110 for transporting data packets between TNCs 78, or between a TNC 78 and a DCP 80, or between DCPs 80.

The TNC interface 254 is accessed by the corresponding TNC 78 to: (1) transfer service request between the TNC 78 and its corresponding GWY 82 (level one protocol sequences) to prepare connections between TNCs, (2) control redundant TGC 88 and TIN 106 plane selection, and (3) monitor GWY fault detection and isolation logic.

The TNC interface 254 comprises a set of control registers and a set of status registers, which will be discussed in greater detail in connection with FIG. 7. Data is transferred to and from these registers via the data transmit line 246.

The TGC request interface supplies the logic required to transmit GWY requests to the TGC 88. The TGC request interface 268 transmits three level one functions, namely: (1) originator service requests, (2) path requests, and (3) release requests. A point-to-point request bus is provided from each GWY 82 to both copies of the associated TGC pair 88. The request bus 266 is shared by the three level one request functions on a priority basis.

An originating service request is initiated by a TNC 78 when it requires connection to a server TNC 78. The server GWY address (0-15) and the server group address (0-3) are passed to the TGC pair 88 with the service request.

A path request is initiated by a server GWY 82 after a service request is present in the service request fifo 290 and the server GWY is in an idle condition (not transferring packet data). The service request fifo 290 contains a queue of addresses (originating GWY and group addresses) associated with the originating service request. When the path request is sent to the TGC pair 88, the originating address at the top of the queue is transmitted along with the request.

A release request is initiated by a server TNC 78 after a packet data transmission is complete. The originating GWY address and the originating group address are sent to the TGC pair 88 with the request.

After initiation of any of the three types of requests, the request bus 266 is busy until the TGC pair 88 accepts the request. Each TGC pair 88 is connected to sixteen GWYs. Once the TGC pair 88 accepts the current request, it responds with a request acknowledge indication on the response bus 270.

When a TNC 78 initiates either a service request or a release request, it may set a bit indicating that a trace is to be performed on all the transactions caused by the request. The trace function is used by the maintenance software for fault isolation, i.e., to determine the point at which communications between boards are interrupted. The trace bit is transmitted along with the request and causes each board that handles the request to store all associated information in the trace buffers, which are available via the maintenance shell. The trace bit is loaded into the service request fifo 290 of the server GWY and causes the associated path request to also set the trace indicator.

A trace monitor is provided at the input of the request interface 268 and may be read by the TNC 78 via the TNC interface 254. One register of the request interface trace monitor contains bits that monitor service or release requests initiated by the TNC 78. A second register is provided for tracing path requests initiated by the state controller. Outbound service requests received by a server gateway are loaded into the service request fifo along with the trace indicator bit generated by the originator TNC. When the trace bit is active for an entry in the service request fifo, a trace bit is also activated for the corresponding path request and the path request transaction is loaded in the path request trace register.

The TGC response interface 274 receives responses from the TGC 88 for setting up communication paths. The GWY 82 transmits requests to both copies of the TGC pair 88 and expects responses from both. An internal multiplexer at the input of the response interface 274 selects the active TGC 88 as directed by the TNC 78. The response interface compares the response buses 270 and sets an error flag for miscompares. The error flag is detected by the TNC 78 which chooses the active TGC 88 based on the error flag.

Parity bits generated across data fields on the TGC are monitored by the response interface for error detection of the response bus 270. Only the data from the selected TGC 88 is monitored for error detection. If an error is detected, an error flag is set and further processing by the GWY on the transaction is inhibited. The error flags associated with comparison and parity monitors int he response interface are available to the TNC 78 via the TNC interface 254.

The TGC response interface 274 receives level one responses from the TGC 88. The TGC response interface 274 performs six functions: (1) request acknowledge, (2) server service request, (3) server path acknowledge, (4) originator path acknowledge, (5) server release acknowledge, and (6) originator release acknowledge.

The request acknowledge response is returned to the originating GWY by the TGC 88 to indicate that a request currently being presented has been accepted. No distinction is made based on request type for this acknowledgment. The acknowledgment idles the request bus 266 such that it is available for other transactions.

The server service request response is generated by the SRD 94 in response to an originating service request from the request interface 268. The server service request is transmitted to the server GWY via the TGC 88 and the TGC response bus 270. The service request contains the address of the originating GWY. The response interface 274 receives the request from the TGC 88 and loads the request into the service request fifo 290. As previously described, a service request pending in the service request fifo causes a path request to be generated by the request interface 268 on the request bus 270 if the request bus 266 is idle, and if there is no packet data transfer being performed by the GWY 82.

The TNC 78 associated with the GWY can intervene in the processing of a service request in two ways. A hold signal line 160 comprising part of the control line 244 is provided from the TNC 78 to the TNC interface 254 which inhibits any new path requests from being executed. Also, an abort register is available in the TNC interface 254 that permits the server TNC 78 to abort a service request in the service request fifo 290. This register is loaded with the originator address of the request to be aborted through the TNC interface 254. When the request reaches the top of the queue, it is removed without executing, and the abort busy flag (set when the register was written) is cleared. The abort register can also be programmed to remove all the server requests except a chosen one.

The server path acknowledge and originator path acknowledge responses are generated by the TIS 98 in response to path requests by the request interface. The acknowledgments are transmitted to the server and the originator GWYs, respectively, by the TIS 98 through the associated TGC 88 and TGC response bus 270. A header transmitted with the acknowledge indicates whether the request was accepted (ACK) or denied (NACK). If a positive acknowledgment is received, a signal is transmitted to the TNC 78 via the TNC interface 254 to initiate the packet data transfer. Accordingly, a level two busy flag indicating transmission of packet data is set on the GWY, thereby inhibiting the execution of path requests on the request bus 266. Separate signals are provided to the TNC for the server and originator path acknowledgments.

If the TIS 98 generates a negative acknowledgment in response to the path request, the GWY 82 issuing the path request causes the current request at the top of the service request fifo 290 to rotate to the bottom of the queue. A NACK to the originator GWY causes no action to be taken other than setting a flag indicating that the transaction was received. The flag is available to the originating TNC interface 254.

The server and originator release acknowledge transactions are generated by the TIS 98 in response to a released request from the request interface 268 of the server GWY 82 and are transmitted to the server and originator GWYs 82 through the associated TGCs 88. Both release acknowledge types are used to terminate a packet data transfer transaction. Either type cause the level two "busy" flag to be cleared on the GWY and permits the GWY 82 to resume execution of path request. If the GWY fails to receive a release acknowledge, it will not execute further path requests until a maintenance action is taken.

Trace buffers are provided on the response interface 274 for tracing level one (connection request) transactions received from the TGC 88.) A separate trace buffer is provided for each of the transactions.

The packet interface link 256 comprises a packet transmitter and a packet receiver. The packet transmitter facilitates the transfer of data packets from the TNC 78 to the TIN 106. Data is received from the originating TNC 78 on the transmit data bus 246 and is transmitted to the TIN 106 on the transmit data line 262. The packet transmitter comprises three functional elements: (1) a transmitter synchronizer, (2) a packet transmitter A, and (3) a packet transmitter B. The processing node link 84 between the GWY 82 and TNC 78 is designed to operate for cable lengths up to 100 feet. In order to permit cables of this length, timing information must be transmitted to the GWY 82 along with the data, such that the data can be reliably recovered. Data on the transmit data lines 246 is recovered on the GWY using the transmit 4 MHz line 248 from the TNC 84. The recovered data is synchronized with the timing on the GWY 4 MHz clock line 252 which is derived from the timing signals received from the TIN 106 over the receive 40 MHz clock line 260.

Figure 18:
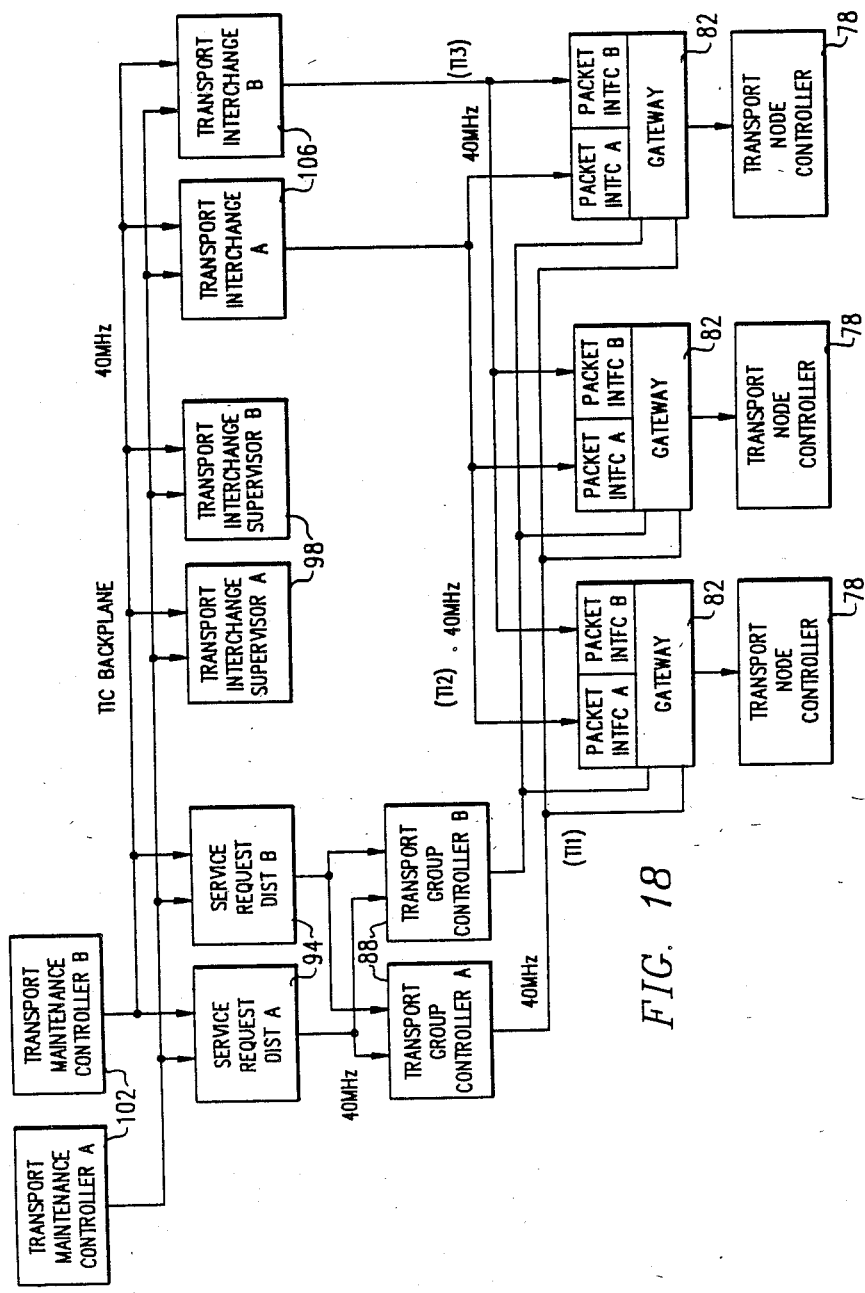
FIG. 18 illustrates a block diagram of the timing distribution in the message transport network.

Data is transmitted to two packet transmitters A and B, one associated with each redundant TIN plane. The data arrives at the transmitters in a 10-bit parallel format. The data is synchronized with timing signals received from the TIN planes in their respective packet transmitters A and B, and is then converted to a serial format for transmission on the packet transport link 110. The creation of "timing islands", discussed in more detail in connection with FIG. 18, is required to minimize skew for the high speed data arriving at the TIN 106.

Parity generated on the TNC 78 is transmitted through the GWY 82 and TIN 106 with the data. The parity bits are continuously monitored in the packet transmitters A and B at a point just prior to the duplicated sections of the packet transmitter. When a parity error is detected, an error flag is set and made available to the TNC 78. The primary fault isolation technique used for the packet interface 256 is a trace facility. The trace facility works in conjunction with a checksum character appended to each packet. It is calculated in the TNC cards by LRC generator 228 as the packets are received from the processors 72, and the checksum is appended to the end of the packet and sent with the packet through the GWYs 82 and packet transport link 110.

Trace monitors are provided on each card involved in the transmission. A trace operation is invoked by setting a trace bit in the first byte of the packet. A packet trace monitor is equipped on the GWY 82 and shared between the packet transmitter and the packet receiver. The selection of the direction to be monitored is controlled by the TNC 78 via the TNC interface 254. When a trace bit is detected in a packet by the monitor, it calculates the checksum, latches the calculated and transmitted checksums, and sets a flag indicating that a trace has been executed. Once the trace complete bit is set, no new trace functions are performed until the check sum trace buffers are read by the TNC.

The packet receiver transfers data from the TIN 106 to the TNC 78. Data is received on the packet transport link 110 through the receive data bus 258. A separate receiver is provided for each TIN plane. The 40 MHz serial data arriving at the receivers is recovered using timing signals from the respective TIN planes and it is converted from serial to parallel. The receive packet data is synchronized with the GWY time base in the parallel domain. The data from two planes is compared by logic in the receiver, with an error flag set for miscompares. This flag is available to the TNC 78 through the TNC interface 254. Data from the active copy of the TIN 106 is selected by a multiplexer and the data is transmitted to the TNC 78 via the receive data bus 250. The multiplexer is controlled by the TNC 78.

Parity and trace logic is provided by the packet receiver in addition to the comparison monitor as described above. Parity on the receive data bus 258 is continuously monitored, with an error flag set if appropriate. As in the case of the packet transmitter, no other action is taken by the GWY 82 due to parity errors. The trace monitor used by the packet receiver is shared with the packet transmitter.

Figure 7:
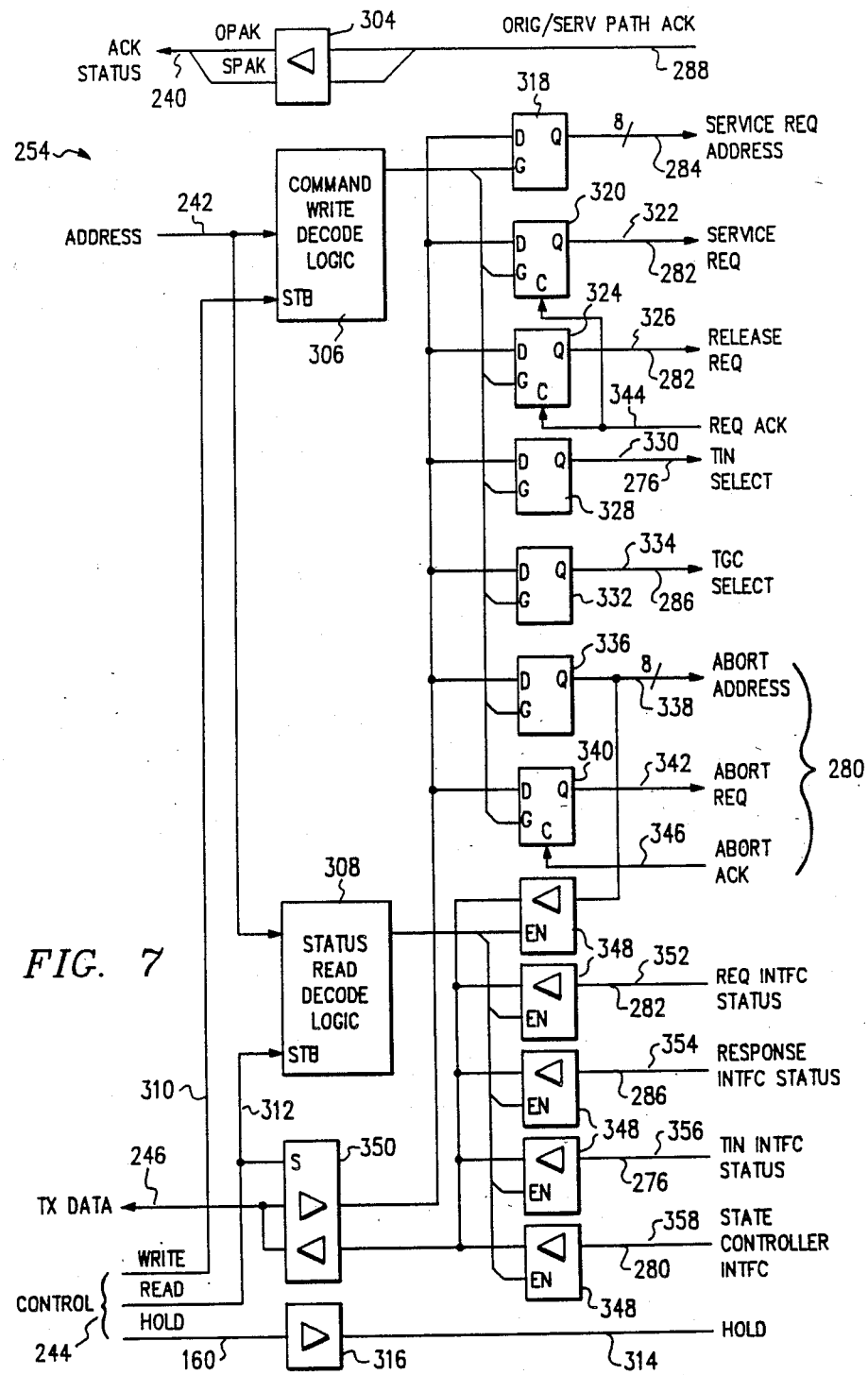
FIG. 7 illustrates a block diagram of the TNC interface section of the gateway subsystem.

FIG. 7 illustrates the TNC interface 254. In the TNC interface 254, a buffer 304 connects the originator/server path acknowledge line 288 to the acknowledge status line 240. The address line 242 is connected to command write decode logic 306 and to status read decode logic 308. A write line 310 and a read line 312, forming part of the control line 244, are connected to the strobe ports of the command write decode logic 306 and the status read decode logic 308, respectively. The hold line 160, described in connection with FIG. 5, of the control line 244, is connected to a second hold line 314 by a buffer 316. The command write decode logic 306 is connected to the gate port of a number of registers. The registers include a server address register 318 connected to the server address line 284, to a service request register 320 connected to the service request line 322 of the control/status line 282, to a release request register 324 which is connected to a release request line 326 of the control/status line 282, and to a TIN select register 328 which is connected to the TIN select line 330 of the control/status line 276. The command write decode logic 306 is also connected to the gate port of a TGC select register 332 connected to the TGC select line 334 of the control/status line 286, an abort address register 336 connected to the abort address line 338 of the control/status line 280, and to an abort request register 340 connected to the abort request line 342 of the control/status line 280. A request acknowledge line 344 of the control/status line 286 is connected to the clear ports of the service request register 320 and the release request register 324. An abort acknowledge line 346 is connected to the clear port of the abort request register 340.

The status read decode logic 308 is connected to the enable ports of a plurality of line drivers 348. The line drivers, in conjunction with a transceiver 350, selectively connect the transmit data line 246 with the abort address line 338 of the control status line 280, the request interface status line 352 of the control/status line 282, the response interface status line 354 of the control/status line 286, the TIN interface status line 356 of the control/status line 276, and the state controller status line 358 of the control/status line 280.

The transceiver 350 also connects the transmit data line 246 with the data ports of the service address register 318, service request register 320, release request register 324, TIN select register 328, TGC select register 332, abort address register 336, and abort request register 340. The transceiver 350 is connected to the read line 312.

The command write decode logic 306 decodes the four bit address bus received from the TNC 78 for writing data presented on the transmit data bus 246 to an addressed control function if an appropriate signal is present on the write line 310. The transmit data bus 246 is used for transmitting packet data from the TNC 78 to the GWY 82 when a packet connection is active. When the bus is not active for packet transport, it is used by the TNC 78 to access the TNC interface 254. In this instance, the transmit data bus 246 is bidirectional and supports both read and write operations.

The status read decode logic 308 decodes the four bit address bus 242 for gating the line drivers 348 to connect the transmit data bus 246 to the lines associated with the line driver 348, if an appropriate signal is present on the read line 312.

Service requests are initiated by the TNC 78 by writing an eight bit address into the server address register 318, followed by activating the service request signal. The service request is cleared by the request acknowledge signal being returned on the request acknowledge line 344 by the TGC 88 via the TGC response interface 274.

After a packet has been transmitted, the connection is released by a release request command from the server TNC 78, which is subsequently stored in the release request register 324. The address of the originating gateway 82 is read from the service request fifo 290 and is transmitted to the TGC 88 with the request. The release request is cleared by the release acknowledge signal present on the release request acknowledge line 344.

The GWYs 82 are connected to redundant TGCs 88 and TINs 106. Data is transmitted to both copies of the redundant units by the GWYs 82 but received data must be selected form one copy. TIN SELECT and TGC SELECT signals are controlled by the TNCs 78 for selecting the active TIN and TGC copies.

Certain error conditions require that service requests posted in the service request fifo 290 be aborted. A request can be aborted when it reaches the top of the fifo queue by writing the address of the originating GWY 82 in the abort address register 336 and invoking a abort request signal. The abort request signal is cleared by the abort acknowledge signal generated by the state controller 278 when the request is executed.

The status of the request interface 268, response interface 274, packet interface 256 and state controller 278 can be monitored by the TNC 78. Status conditions include error conditions reported by parity and comparison logic and the contents of trace buffers. Also certain registers such as plane select registers 328 and 332 may be written to by the TNC 78 and may be read for conformation.

Server path acknowledge (SPAK) and originator path acknowledge (OPAK) signals generated by the response interface 274 are buffered and transmitted to the TNC 78. A hold signal generated by the TNC 78 is buffered and transmitted to the state controller 278 for delaying new path requests.

TGC Request Interface

FIG. 8 illustrates a block diagram of the TGC request interface 268. The request interface 268 receives signals from the TNC interface 254 over several lines including: the release request line 326, the service request line 322, the request interface status line 352, and the service request address line 284. The request interface 268 receives signals from the state controller over the path request line 298 and from the service request fifo 290 on the originator address line 292. The request interface 268 outputs signals to the A and B copies of the TGC 88 over the request bus 266.

The release request line 326, service request line 322, and path request line 298 are connected to a priority encoder 366. The originator address line 292 and service request line 322 are connected to a multiplexer 368. The select port of the multiplexer 368 is connected to the output of the priority encoder 366. The output of the multiplexer 368 is connected to a request link formatter 370 which is also connected to the output of the priority encoder 366. The output of the request link formatter 370 is connected to a trace monitor 372 which also is connected to the request interface status line 352. The output of the request link formatter 370 is also connected to the TGC request links 266 via buffers 374.

Service request, path request and release requests are transmitted through the TGC request interface 268. Service request and release requests are initiated by TNCs 78 and path requests are initiated by the state controller 278 in response to outbound service requests. A priority encoder 366 resolves contention for the request bus 266 when simultaneous requests are made.

Service request are made by originating GWYs 82 and they contain the address of the server GWYs 82. The address of the server is obtained from the server address register 318 in the TNC interface 254. Path requests and release requests are initiated by server GWYs 82 and contain the address of the associated originating GWY 82. The address of the originating GWY 82 is obtained from the service request fifo 290.

The request link formatter 370 formats the server or originator GWY address and the function code defining the type of request for transmission on the TGC request bus 266.

The trace monitor 372 contains trace buffers for each of the three request types. A trace can be invoked by a TNC 78 when a service request or release request is initiated.

Figure 9:
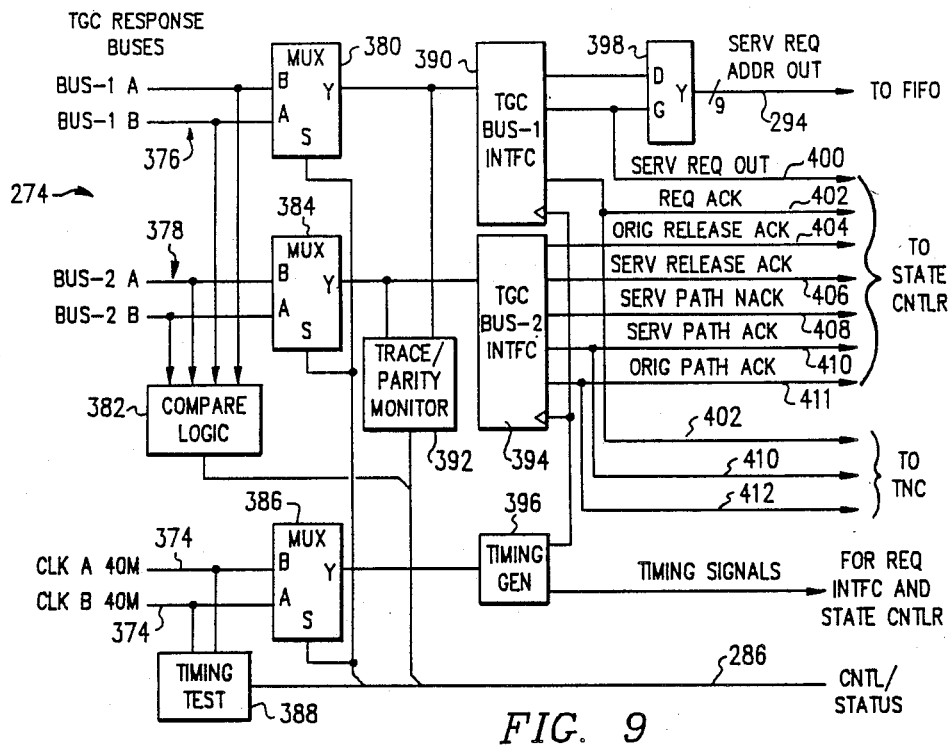
FIG. 9 illustrates a block diagram of the response interface section of the gateway subsystem.

The TGC response interface 274 is illustrated in FIG. 9. The TGC response interface 274 is connected to the TGC 88 via the TGC response buses 270 from both A and B copies of the TGC. The response interface 274 also receives timing signals from the TGC 88 on clock lines 374 of the response bus 270. The A and B copies of the response interface 274 receive outbound service requests on a first bus 376 and receive request acknowledgments on a second bus 378. The first bus 376 is connected to a multiplexer 380 and to compare logic 382. The second bus 378 is connected to another multiplexer 384 and to the compare logic 382. The clock line 374 are connected to a multiplexer 386 and to timing test logic 388. The control/status line 286 is connected to the timing test logic 388 and to the select ports of the multiplexers 380, 384 and 386.

The output of the multiplexer 380 is connected to a first bus interface 390 and a trace/parity monitor 392. The output of the multiplexer 384 is connected to a second bus interface 394 and to the trace/parity monitor 392. The trace/parity monitor 392 and compare logic 382 are also connected tot he control/status line 286.

The output of the multiplexer 386 is connected to a timing generator 396, which is connected to the first and second bus interfaces 390 and 394. The timing generator 396 outputs timing signals for the request interface 268 and state controller 278. The first bus interface 390 is connected to the service request address line 294 via a register 398. A service request out line 400 is connected between the first bus interface 390 and the gating port of the register 398, and is connected to the state controller 278. The first bus interface is also connected to a request acknowledge line 402 to the state controller 278 and to the TNC interface 254.

The second bus interface 394 is connected to an originator release acknowledge line 404, a server release acknowledge line 406, a server path negative acknowledge line 408, a server path acknowledge line 410, and an originator path acknowledge line 411. The server path acknowledge line 410 and originator path acknowledge line 411 are also connected to the TNCs 78 via a TNC interface 254. Select signal from the TNC interface 254 selects the active copy. Compare logic 382 compares data arriving on the A and B copies of the two buses, and an error flag is set when data on the corresponding buses fails to match.

Trace buffers are provided in the trace/parity monitor 392 to capture data arriving at the interface when a trace indicator bit is set for the receive transactions. Timing test logic 388 permits the testing of timing signals received from both TGC copies over the clock line 374. Timing signals from the selected TGC are used to time functions on the response interface 274, request interface 268, and state controller 278.

When an outbound service request is received on the first bus 376, the address of the originating gateway is stored in the register 398 along with the trace indicator bit and a service request out signal is transmitted to the state controller 278 over the service request out line 400. A request acknowledge signal is also provided on the first bus 376, and is issued by the TGC 88 to acknowledge the current request being presented on the TGC request links 266. This signal is sent to the state controller over the request acknowledge line 402.

When path requests and release requests are accepted by the TIS 98, acknowledgments are transmitted to both the server and originator gateways 82. When a path request is rejected by the TIS 98, a negative acknowledgement (NACK) is transmitted to the server and originator gateway 82, but the originator path negative acknowledgement causes no action on the TGC Response Interface 274. Signals corresponding to these acknowledgments are transmitted to the state controller by the second bus interface 394. The server path acknowledge and originator path acknowledge signals are also transmitted to the TNC via the TNC interface 254.

The TNC has access to the compare error logic 382, the trace/parity monitor 392, and the timing test logic 388 through the TNC interface 254.

Figure 10A:
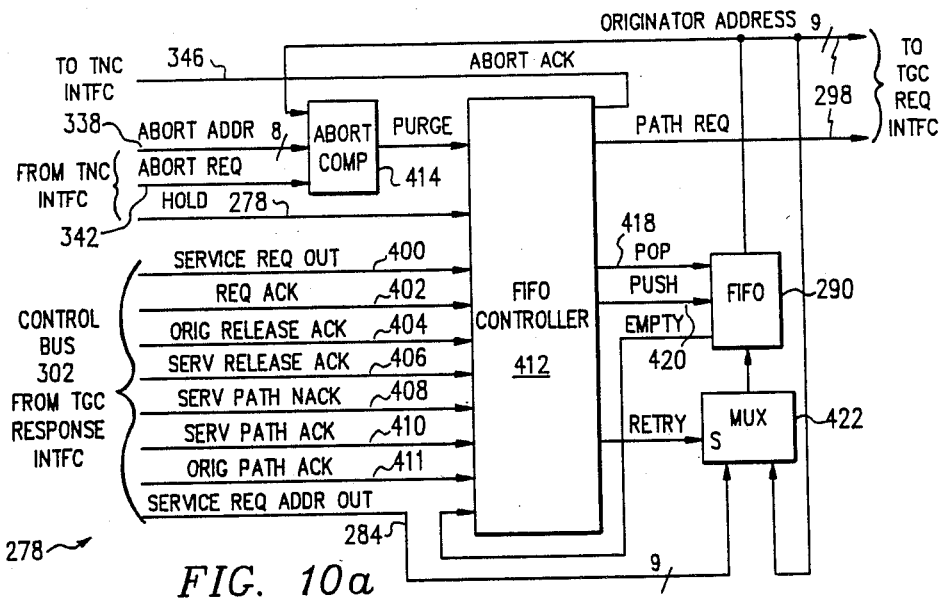
FIG. 10a illustrates a block diagram of the state controller section of the gateway subsystem.

The state controller 278 is illustrated in FIG. 10a. The state controller 278 comprises a fifo controller 412 which receives signals from the service request out line 400, request acknowledge line 402, originator release acknowledge line 404, server release acknowledge line 406, server path negative acknowledge line 408, server path acknowledge line 410, and originator path acknowledge line 411 from the response interface 274. The fifo controller 412 is also connected to the hold line 314 from the TNC interface 254 and from the output of an abort comparitor 414 which receives signals over the abort request line 342 and abort address line 338 of the TNC interface 254 and the path request line 298 from the request interface 268. The fifo controller is connected to the abort acknowledge line 346 of the TNC interface 254. The fifo controller outputs a signal to the path request line 298 and outputs "POP" and "PUSH" signals to a fifo 290 over a POP line 418 and a PUSH line 420. The fifo 290 outputs an empty signal to the fifo controller 412. The service request address out line 294 from the response interface 274 is connected to a multiplexer 422 along with the path request line 298. A retry signal from the fifo controller 412 is connected to the select port of the multiplexer 422. The output of the multiplexer 422 is connected to the input of the fifo 290. The output of the fifo 290 is connected to the path request line 298.

The state controller controls the service request fifo 290 and generates path requests. When a service request out signal is received from the response interface 274, the state controller 278 pushes the data received on the service request address bus out 294 into the service request fifo 290. Pushing data into the service request fifo 290 clears the empty signal to the fifo controller 412, and if a path request is not pending or a connection is not active, the controller 412 initiates a path request for the originating gateway 82 addressed by the service request.

A request acknowledge clears the path request signal generated by the fifo controller 412 and causes the fifo controller 412 to enter the server path pending state. Receiving an originator path acknowledge signal places the controller in the originator state and inhibits any new path requests. Receiving a server path acknowledge signal moves the controller from the server path pending state to the server state and new path requests continue to be inhibited.

When a server path negative acknowledge is received, a retry sequence is initiated and the controller is returned to the idle state if it is in the server path pending state. If the controller is in the originator state when the server path negative acknowledge is received, the retry sequence is initiated, but the controller state is not changed. For the retry sequence, the retry signal gates the output of the service request fifo 290 to its input, and a PUSH signal is generated followed by a POP signal. This sequence rotates the current service request to the bottom of the queue.

Receiving an originator release acknowledge or a server release acknowledge returns the controller to the idle state. The server release acknowledge also causes a POP signal to be generated to remove the address at the top of the service request fifo 290 from the queue.

When the hold signal is invoked, no path requests are initiated regardless of the state of the controller 278.

The abort request signal is used to abort a service request in the service request fifo 290. With the abort request signal set, the address at the top of the service request fifo 290 is compared with the abort address provided by the abort address line 338, and if the two addresses match, the purge signal is produced. The purge signal causes the address at the top of the fifo to be discarded by the POP signal. The abort acknowledge signal clears the abort request signal.

Figure 10B:
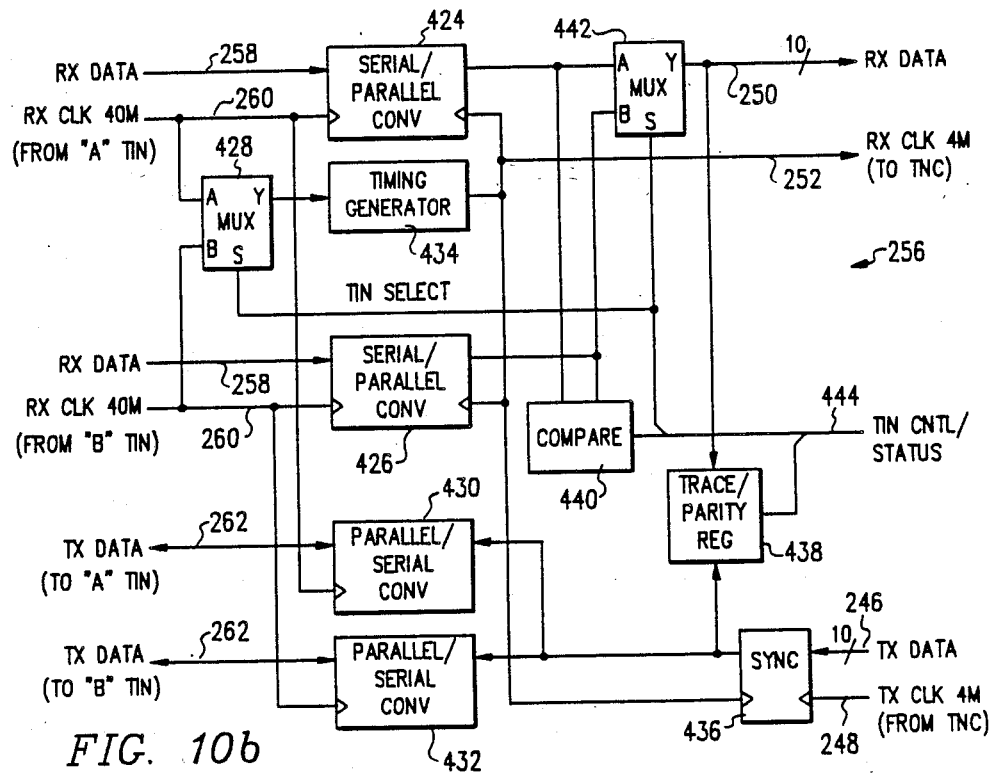
FIG. 10b illustrates a block diagram of the packet interface section of the gateway subsystem.

The packet interface 256 is illustrated in FIG. 10b. The receive data buses of the A and B copies of the TIN 106 are connected to serial-to-parallel converters 424 and 426. The receive 40 MHz clock buses 260 are connected to the serial-to-parallel converters 424 and 426, to a multiplexer 428, and to parallel-to-serial converters 430 and 432. The transmit data buses 262 of the A and B copies of the TIN 106 are connected to the parallel-to-serial converters 430 and 432.

The output of the multiplexer 428 is connected to a timing generator 434 which outputs the timing signals to the serial-to-parallel converters 424 and 426 and the parallel-to-serial converters 430 and 432. The timing generator 434 also is connected to a synchronizer 436 which also receives the transmit 4 MHz clock line 248 from the TNC 78. The synchronizer 436 receives data over the transmit data bus 246 from the TNC 78 outputs data to the parallel-to-serial converters 430 and 432 and to a trace/parity register 438.

The outputs of the serial-to-parallel converters 424 and 426 are connected to a compare logic 440 and to a multiplexer 442. The output of the trace/parity register 438 and compare logic 440 are available to the TIN control/status line 444 which is also connected to the select port of the multiplexer 442. The output of the multiplexer 442 is connected to the receive data line 250 and the output of timing generator 434 is connected to the receive 4 MHz clock 252. The receive data line 250 is also connected to the trace/parity register 438.

Inbound packet data on the transmit data bus 246 from the TNC is recovered on the gateway 82 using the 4 MHz clock on the transmit 4 MHz clock line 248. The receive data is synchronized to the packet interface time base of the gateway 82 through the synchronizer 436. The synchronized data is presented to the parallel-to-serial converters 430 and 432 associated with each of the two transmit data buses 262.

Ten bit parallel data is clocked to the parallel-to-serial converters 430 and 432 from the synchronizer 436 using packet interface timing signal. Parallel-to-serial conversion is performed in each converter and serial data is transmitted on the TX data lines 262 using the time base derived from the 40 Mhz clock received from the associated TIN 106.

Outbound packet data arriving from the TIN 106 is recovered at the serial-to-parallel converters 424 and 426 using a clock received from the associated TIN 106 and parallel data is clocked out of the converters by packet interface timing signals.

Outbound packet data is received from both TIN planes and is selected from the active plane under the control of the TNC. The receive clock signal form the active TIN 106 is also selected for generating packet interface timing signals.

Compare logic 440 compares data received from the A and B copies of the TIN 106 and error flags are set when the data fails to compare. Trace/parity registers are provided for testing inbound packet data and outbound packet data from the active TIN 106.

Figure 10C:
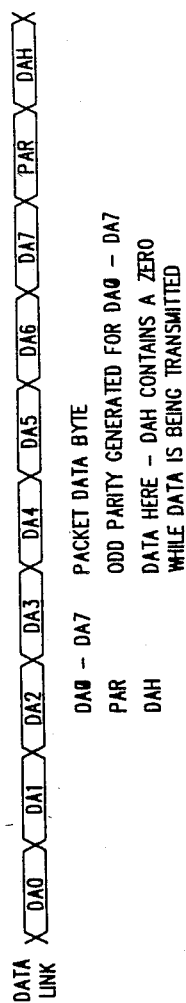
FIG. 10c illustrates the structure of a packet data word.

A packet data word is illustrated in FIG. 10c. The packet data word comprises eight data bits DA0–DA7, forming a data byte. An odd parity bit is transmitted with the data word. A "data here" (DAH) bit signals data is being transmitted.

TIC Subsystem Configuration

Figure 11:
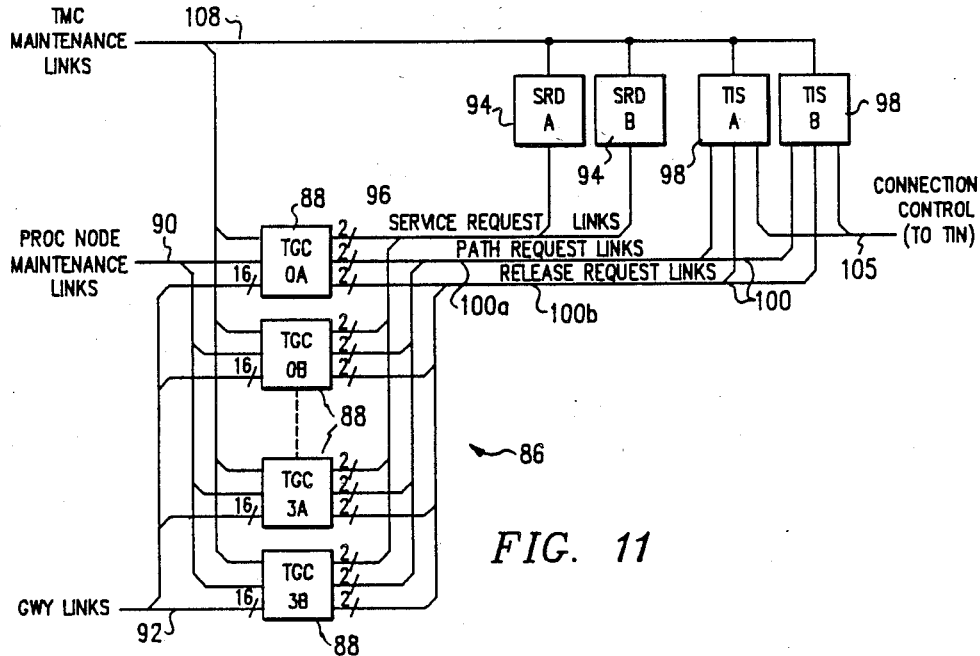
FIG. 11 illustrates a block diagram of the transport interchange control subsystem.

FIG. 11 illustrates a block diagram of the TIC 86. The TIC 86 comprises the TGC 88, the SRD 94, and the TIS 98. The TGCs 88, SRD 94 and TIS 98 are implemented in duplex, such that there are "A" and "B" copies of each. As previously discussed, the copies are implemented with complete redundancy such that either the "A" or "B" card can be used in the event of the failure of the other.

In the preferred embodiment, four TGC pairs 88 (TGC 0A/B, TGC 1A/B, TGC 2A/B, and TGC 3A/B) are used. Each TGC pair 88 can support up to sixteen GWYs, enabling the use of a total of sixty-four GWYs 82.

The GWYs 82 are connected to the GWYs 88 over GWY request and response links 92. The processing node maintenance links 90 are connected between the TNCs 78 and the TGCs 88. The TMC maintenance link 108 is connected between the TGCs 88 and the TMC 102, and also to the SRD 94 and the TIS 98.

Each TGC 88 is connected to the SRD pair 94 via the service request links 96. The TGCs 88 are connected to the TIS 98 via path/release request links 100, shown in FIG. 11 as path request links 100a and release request links 100b. The TIS 98 is connected to the TIN 106 via the connection control bus 111.

The TIC 86 provides a mechanism for establishing packet transport connections between processing nodes. The TIC 86 supports three level one requests: (1) service request, (2) path request, and (3) release request.

As previously described, an originating node initiates a service request by writing to the service request register via the originating GWY and associated TNC. The service request contains the address of the serving node to which a packet is to be delivered. The TIC 86 transmits the service request to the server GWY 82, where it is placed in a service request queue. The queue contains the addresses of all of the originating GWY 82 for which service requests are pending for that node. When the server GWY 82 is ready to accept service requests, it initiates a path request to the TIC 86, which sets up a path to the server GWY 82 through the TIN 106. After the request packet has been transmitted, the server GWY 82 releases the connection by initiating a release request to the TIC 86. The subsystem of the TIC are illustrated in detail in FIGS. 12–14.

TGC Subsystem

Figure 12:
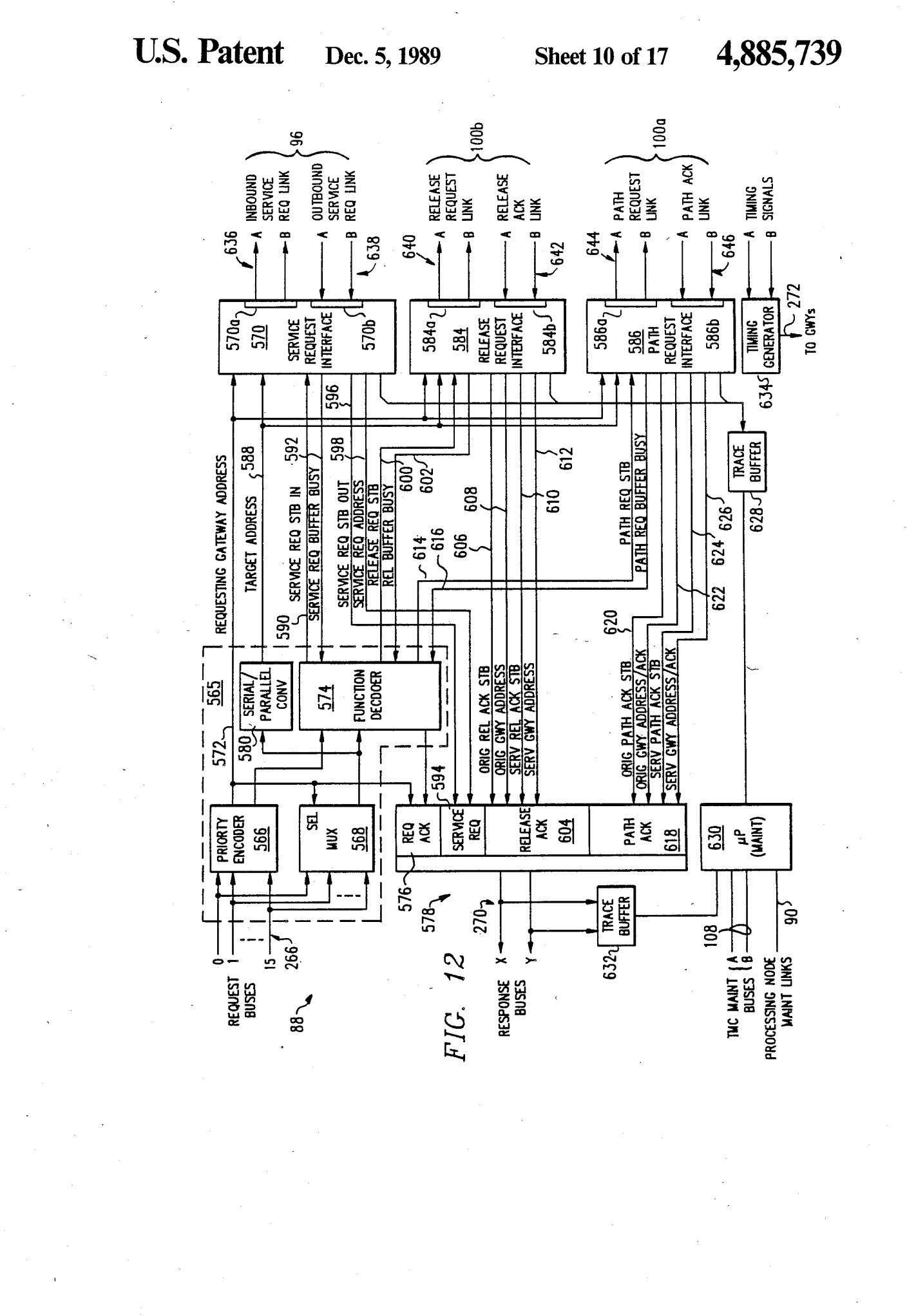

FIG. 12 illustrates the TGC 88 in greater detail. The request buses 266 of the sixteen GWYs 82 connected to the particular TGC 88 are connected to a priority encoder and a multiplexer 568. The priority encoder is connected to a service request interface 570 via a requesting GWY address bus 572 and to a function decode 574. The requesting GWY address bus 572 is also connected to the select port of the multiplexer 568 and to a request acknowledge buffer 576 of a TGC response interface 578. The multiplexer 568 is connected to the function decode 574 and to a serial-to-parallel converter 580. The function decode 574 is also connected to the request acknowledge buffer 576.

In addition to the service request interface 570, the TGC 88 has a release request interface 584 and a path request interface 586. The requesting GWY address bus 572 connects the priority encoder 566 with the service request interface 570, the release request interface 584, and the path request interface 586. A target address bus 588 connects the serial-to-parallel converter 580 to the service request interface 570, the release request interface 584, and the path request interface 586. A service request "strobe in" bus 590 connects the function decode 574 with the service request interface 570. A "service request buffer busy" bus 592 provides a return signal between the service request interface 570 and the function decode 574. A service request interface 570 is also connected to a service request buffer 594 of the response interface 578 via a service request "strobe out" bus 596 and a service request address bus 598.

The release request interface 584 is connected to the function decode 574 by a release request strobe bus 600 and a release "buffer busy" bus 602. The release request interface 584 is also connected to a release acknowledge buffer 604 of the response interface 578 via an originating "release acknowledge strobe" bus 606, an originating GWY address bus 608, a serving "release acknowledge strobe" bus 610 and a server GWY address bus 612.

The path request interface is connected to the function decode via a path request strobe 614 and a path request "buffer busy" bus 616. The path request interface 586 is connected to the path acknowledge buffer 618 of the response interface 578 via a originating path "acknowledge strobe" bus 620, an originating GWY address/acknowledge bus 622, a serving path "acknowledge strobe" bus 624, and a serving GWY address/acknowledge bus 626. A trace buffer 628 is connected to the service request interface 570, the release request interface 584, and the path request interface 586. The output of the trace buffer 628 is connected to a maintenance 630. The maintenance microprocessor 630 receives inputs from the TMC maintenance buses 108 and the processing node maintenance links 90. The maintenance microprocessor 630 is connected to a second trace buffer 632, which is connected to the response buses 270 of the GWY request and response links 92.

The TGC 88 also includes a timing generator 634 which receives clock and framing signals from the SRD 94 and transmits clock and framing signals to the GWY 82 to which it is connected.

The service request interface 570 is connected to the A and B copies of the SRD 94 over the SRD request links 96 comprising inbound and outbound service request links 636 and 638. The release request interface 584 is connected to A and B copies of the TIS 98 via the release request links 100b, comprising the release request link 640 and the release acknowledge link 642. The path request interface 586 is connected to the TIS 98 via the path request links 100a, comprising the path request link 644 and path acknowledge link 646.

The TGC 88 participates in both the level one (connection) and level four (maintenance) protocols and provides access to other level one subsystems for up to sixteen GWYs 82. The GWYs 82 transmit requests to the TGC 88 on the request buses 266 and receive responses on the response buses 270. The request buses 266 are point-to-point with each GWY 82 having a duplicate link to the A and B copies of the TGC pair 88. Each TGC 88 provides two response buses 270 (X and Y) which are multi-drop with each bus supporting eight GWY 82.

Each of the four TGCs 88 are duplicated A and B copies, with either copy supporting all of the subordinate GWYs 82. Each GWY 82 provides a separate request bus 266 for each TGC copy and receives response bus 270 from both TGC copies. The service request links 96, path request links 100a, and release request links 100b are cross-connected between all related elements, redundant TGCs 88, SRDs 94 and TISs 98, in order to provide a high degree of availability for the level one functions.

The TGC 88 resides between the TMC 102 and the TNC 78 in the maintenance communication shell.

The major functional elements of the TGC 88 are: (1) a TGC request receiver 565 comprising the priority encoder 566, the multiplexer 568, serial/parallel converter 580 and the function decode 574, (2) the TGC response bus interface 578, (3) the service request interface 570, (4) the path request interface 586, (5) the release request interface 584, (6) the timing distributor 634, and (7) the maintenance microprocessor 630.

The TGC request receiver 565 accepts service requests, path requests, and release requests from the GWYs 82 connected to the TGC 88, and routes the requests to the SRD 94 and the TIS 98. The TGC request receiver 565 resolves contention for GWY requests, acknowledges acceptance of the selected request, and forwards the request to the appropriate output interface.

The sixteen GWYs 82 associated with a TGC 88 share a common request receiver 565. The GWYs 82 have the opportunity to issue a request once during each 400 nsec request cycle. The request receiver latches all of the requests being presented for one cycle simultaneously and selects one to be accepted on a rotating priority basis determined by the priority encoder 566. The TGC 88 determines if the selected request can be acted upon in this cycle depending on whether the necessary output interface (service 570, release 584 or path 586) is busy. If so, it sends a request acknowledgment to the originating GWY presenting the request. All other GWYs 82 continue to present their requests in each succeeding request cycle until they receive an acknowledgment. Once a GWY 82 is selected it becomes the lowest priority for the next cycle.

Once a request link 266 is selected by the priority encoder, the request is gated to the function decoder 574 and serial-to-parallel converter 580 through a 16:1 multiplexer 568. The serial-to-parallel converter 580 assembles the server GWY address and the function decoder 574 determines which function (service, path, or release) is being requested.

TGC Request Bus Interface

The signals received on the request buses 266 are illustrated in FIG. 12a and 12b. As shown in FIG. 12a, each GWY request bus 266 comprises three lines: a GWY request line 648, a GWY address line 650 and a group address line 652. The GWY request line 648 serially transfers a two bit request code, a trace flag bit and a parity bit. The function connected with the two bit request code is illustrated in FIG. 12b. If the two bit code equals "00," the request is for a service request. If the request code equals "01," request is a path request. If the request code equals "10," then the request is a release request. When the request code comprises a "11," the sending GWY is idle.

The function decoder 574 determines the nature of the request and generates a signal to the appropriate request interface 570, 584, or 586. Therefore, if the request is a service request, the service request interface 570 is signalled by the function decoder 574. Similarly, if the request is a release request, then the function decoder 574 generates a signal to the release request interface 584. In the case of a path/request, the function decoder 574 signals the path/request interface 586.

The GWY address line 650 and the group address line 652 transmit bits corresponding to the address of the desired server GWY, or "target" GWY. The GWY address line 650 transmits a 4-bit code corresponding to one GWY out of a group of sixteen GWYs. The group address line transmits a 4-bit code specifying one of up to sixteen groups of GWYs allowing expansion to 256 gateways using the illustrated signaling format. Hence, a total of 256 GWYs may be specified by the 4-bit code on the GWY address line 650 and the 4-bit code on the group address line 652.

If the request interface 570, 584 or 586 selected by the function decoder 574 is not busy at the time it is signalled by the function decoder 574, a "look-ahead" flag is set in the selected output interface, indicating that a request is being assembled by the request receiver 565. An acknowledgment is sent to the requesting GWY via the response interface 578. After the target GWY address has been assembled in the serial-to-parallel converter, the address of the originating GWY is appended to it. Both addresses are loaded into registers in the relevant output interface 570, 584 or 586.

The parity bit specified on the GWY request line 648 is received from the originating GWY with each request. Detection logic in the request receiver 565 (not shown) tests the parity of the data gated through the receiver multiplexer 568. When an error is detected, an error flag is set and the abort bit is set, indicating to the other subsystems that the data is bad and should be ignored. The abort bit is required because the TGC 88 generates a look-ahead strobe before the data is assembled and the subsequent subsystems receive this strobe before the data.

The TGC response interface 578 provides the interface to the response buses 270. Two identical response buses are provided, with each bus accommodating eight GWYs 82. The two response buses 266 are required for electrical loading and transmission line considerations only. A single bus is used during a given bus cycle. The functions provided by the response interface 578 are listed in Table 2.

TABLE 2

| Response Interface Functions |
| --- |
| Request Acknowledge |
| Outbound Service Request |
| Server Path Acknowledge |
| Originator Path Acknowledge |
| Server Release Acknowledge |
| Originator Release Acknowledge |

TGC Response Bus

FIG. 12c illustrates the signals transmitted on the response buses 270. The GWY response buses 270 are multi-drop with each bus connecting to eight GWYs 82. Each TGC 88 provides two buses, with bus X connecting to the even number GWYs 0, 2, 4 . . . 14 and bus Y connecting to the odd number GWYs 1, 3, 5 . . . 15. FIG. 12c illustrates the signal on a single response bus, X or Y. Each bus is divided into two sub-buses (bus 1 and bus 2) and is organized into 400 nsec frames, with each frame containing four phases.

Bus-1 is used for service, path and release request acknowledgments and for returning outbound service request. In phase I, the three most significant bits of the address of the GWY to which a request acknowledge is being generated are placed on bus-1, lines 0–2. The least significant bit of the GWY address is used to select the X or Y response bus associated with the GWY being addressed. If a request acknowledge is active for the selected bus, a request acknowledge strobe is generated on the strobe 1 line.

In phase II, the three most significant bits of the address of the GWY for which a service request is being generated are transmitted on bus-1, lines 0–2. The least significant bit of the GWY address is used to select the GWY response bus, X or Y, associated with the GWY being addressed. If a service request is active for the select bus, a service request strobe is generated on the "strobe-1" line. When the service request strobe signal is true, the 8-bits of data contained in phases III and IV are loaded into the service request fifo of the addressed GWY 82.

In phases III and IV, for a frame in which a service request is active, an eight bit address corresponding to the originating node is present on bus-1, lines 0–3. The least significant bits are transferred in the third phase, followed by the most significant four bits of the address in phase IV. The strobe line in phase III contains a trace flage for the service request transaction indicating whether a trace is desired.

Bus-2 is used for the originator path acknowledgments, server path acknowledgments, originator release acknowledgments, and server release acknowledgments. The three most significant bits of the address of the GWY 82 for which an acknowledgment is being generated is transmitted on bus-2 during the phase associated with the particularly acknowledgment. As with bus-1, the least significant bit is used to select either the X or Y bus.

In phase I, the three most significant bits of the address of the GWY for which an originator path acknowledgment is being generated are sent on bus-2, lines 0–2. If an originator path acknowledge is active for the selected bus, an originator path acknowledge strobe is sent on bus-2, line-3. A trace indicator signal is sent on the data line, and applies to both the originator path acknowledge transaction of phase I, and to the server path acknowledge transaction of phase II, described below.

In phase II, the three most significant bits of the address of the GWY for which a server path acknowledgment is being generated, are sent on bus-2. If the server path acknowledge is active for the selected bus, a server path acknowledge strobe is generated on line-3 of bus-2. A path acknowledge signal is gated to the data line in phase II, which applies to both the originator path acknowledge transaction of phase I and to the server path acknowledge transaction of phase II. The path acknowledge signal indicates whether the path acknowledge is positive or negative.

In phase III, the three most significant bits of the address of the GWY for which an originator release acknowledgment is being generated is gated to bus-2. If an originator release acknowledge is active for the selected bus, an originator release acknowledge strobe is generated on line-3 of bus-2. When the trace indicator is set, the trace function is initiated for the originator release acknowledge transaction.

In phase IV, the three most significant bits of the address of the GWY for which a server release acknowledgment is being generated is sent on bus-2. If a server release acknowledge is active for the selected bus, a server release acknowledge strobe is generated on the strobe line. A trace indicator signal associated with a server release acknowledge is gated to the data line in phase IV. When the trace indicator is set, the trace function is initiated for the transaction.

The parity line of bus-2 contains parity for all data on both buses-1 and -2 for the associated phase.

An outbound service request from the TGC 88 to a GWY 82 is generated in response to an outbound service request received by the TGC 88 from the SRD 94 through the service request interface 570. The outbound service request contains the address of the server GWY and the GWY and group address of the originator GWY. The TGC response interface uses the server GWY address to address the receiving GWY; it sends the originator address in the data field associated with the transaction.

Server and originator path acknowledgments from the TGC 88 to a GWY 82 are generated in response to path acknowledgment transactions received from the TIC subsystem. When the server and originator GWYs reside in the same TGC group, both a server and originator path acknowledgment are received in the same transaction. The transaction received from the TIC subsystem 86 contains the address of the server and/or the originator GWY 82 and a bit indicating if a positive or negative acknowledgment is being transmitted. The two addresses are used by the response interface 565 to address the two receiving GWYs 82 independently.

Server and originator release acknowledgments are generated in response to release acknowledgment transactions from the TIC 86. The format and operation of the TGC response interface 578 in this case is the same as that described for the path acknowledgments.

Trace monitors are provided on the TGC 88 at the response interface 578 to be used by the maintenance software for fault isolation. When one of the six level one functions listed in Table 2 handled by the response interface 578 has the trace indicator bit set in the associated transaction, a flag is set in the trace buffer 632 indicating that the trace has been executed. Further, any address and data information contained in the transaction is loaded into the trace buffer 632. Separate flag and trace buffer registers are provided for each of the six response interface functions with the exception of the request acknowledge. These registers are made available to the TGC maintenance processor. The flags are cleared when the processor reads the associated registers.

Parity generation logic is also provided in the response interface. Parity is generated on the address and data information transmitted on the response bus used for testing purposes by the GWY.

TGC Output Interfaces

The service request interface 570 comprises a service request transmitter 570a and a service request receiver 570b. Inbound service requests initiated by the originator GWYs 82 are transmitted to the SRD 94 by the service request transmitter 570a. Outbound service requests destined for server GWYs 82 are received from the SRD 94 by the service request receivers 570b.

An inbound service request contains a server GWY address, a server group address, and a originating GWY address. The request is received from the TGC request interface 565 and the address information stored in an internal buffer in the service request transmitter 570a so that a new request can be queued from the GWYs 82 while the current request is waiting to be accepted by the SRD 94. When the service request transmitter 570a has data in its buffer (or has the look-ahead flag set), a service request is sent to the SRD 94 via the inbound service request link 636. The acknowledgment received from the SRD causes the current buffer to be released and allows new requests to be accepted from the GWYs 82. An inbound link is provided to both copies (A and B) of the SRD 94 and every request is transmitted to both.

A trace buffer associated with the inbound service request links 636 is provided by trace buffer 628. When a trace indicator bit appears in an inbound request, a flag is set to indicate the trace transaction, with all request associated data being loaded into the buffer 628. Parity is generated for the data contained in the inbound service requests and is transmitted with the data for testing in the SRD 94. The trace buffer 632 is associated with the outbound links.

An outbound service request contains a server GWY address, an originator GWY address, and an originator group address. An outbound service request link 638 is provided to each TGC 88 from both copies (A and B) of the SRD 94. The active outbound service request link 638 is selected by the TGC maintenance microprocessor 630. The TGC 88 receives outbound service requests from the selected outbound link and passes the request to the TGC response interface 578.

Parity and comparison monitors are provided in the service request interface 570 for the outbound service request links. Parity is only tested on the active link, but both links are continually compared with associated error reporting to the maintenance processor. The detection of a parity error inhibits the outbound service request from being passed to the server GWY.

The path request interface 586 comprises a path request transmitter 586a and a path acknowledge receiver 586b. Path requests initiated by server GWYs 82 are transmitted to the TIS 98 by the path request transmitter via the path request link 644. Associated acknowledgments are received by the path acknowledge receiver via the path acknowledge link 646.

A path request contains an originator GWY address, an originator group address, and a server GWY address. As with the service request transmitter 570a described above, the received address information is double buffered in the path request transmitter. When the path request transmitter 586a has an outstanding request in its buffer (or the look-ahead flag is set), a path request is sent to the TIS 98 via the path request link 644. When the TIS 98 accepts the request, it responds with a request acknowledge on the path acknowledge link 646. The acknowledgment causes the current buffer to be released and a new request can be accepted from the GWYs 82. A link is provided to both copies of the TIS 98 from each TGC 88. A trace buffer and parity generation are provided on the path request interface 586 for transactions on the path request link that works in the same manner as the trace facility provided with the service request links.

After the TIS 98 has accepted a path request from a TGC 88 and returned a request acknowledge signal, the TIS 98 must determine disposition of the request. When complete, a path acknowledgment is returned to both the server and originator GWYs 82 along with a signal (ACK/NACK) indicating the validity of the request. The path acknowledge link 646 contains a server path acknowledge field and an originator path acknowledge field. A path acknowledge link 646 is provided to each TGC from both SRD copies A and B.

The active path acknowledge link 64 is selected by the maintenance microprocessor 630. The TGC 88 receives the path acknowledgments from the selected link and forwards the acknowledgments to the TGC response interface 578. The active signals are also distributed to the GWYs 82 such that the GWYs 82 receive the signals from both TGC copies.

Parity and comparison monitors are provided in the path acknowledge receivers 586b for fault detection. The links from the A and B copies of the TIS 98 are compared and parity is tested on the active link, paralleling the service request link function.

The release request link interface 584 comprises a release request transmitter 584a and a release acknowledge receiver 584b. Release request initiated by server GWYs are transmitted to the TIS 98 by the release request transmitter 584a via the release request links 640, with acknowledgments being received by the release acknowledge receiver 584b via the release acknowledge links 642. The format for the release request acknowledge links is identical to the path request acknowledge links except that the signal indicating whether the request was honored is not required in the release case.

The release request interface 584 is functionally identical to that of the path request interface 586. The same request selector circuit in the TIS 98 is used for both the path request selector and the release request selector circuits. Therefore, with the exception of the absence of the ACK/NACK signal processing, the release request transmitter 584a and the release acknowledge receiver 584b operate in the same manner as their path request counterparts 586a and b.

The release request and acknowledge links 640 and 642 to the redundant TISs 98 are cross-connected in the same manner as the path request and acknowledge links and use the same fault detection and isolation mechanisms.

Clock and synchronization testing logic is provided on the TGC 88, with status information available to the TGC maintenance microprocessor 630.

In the architecture of the maintenance shell of the MTN 10, the TGC 88 is subordinate to the TMC 102 and is superordinate to the TNCs 78. A communication interface is provided on the TGC 88 to accommodate both buses from both TMC copies. Similarly, both TGCs 88 provide a processing node maintenance link 90 to the TNCs 72.

The maintenance processor firmware performs the message interchange and polling functions required to provide a communication path between the TMC 102 and TNCs 78.

SRD Subsystem

Figure 13:
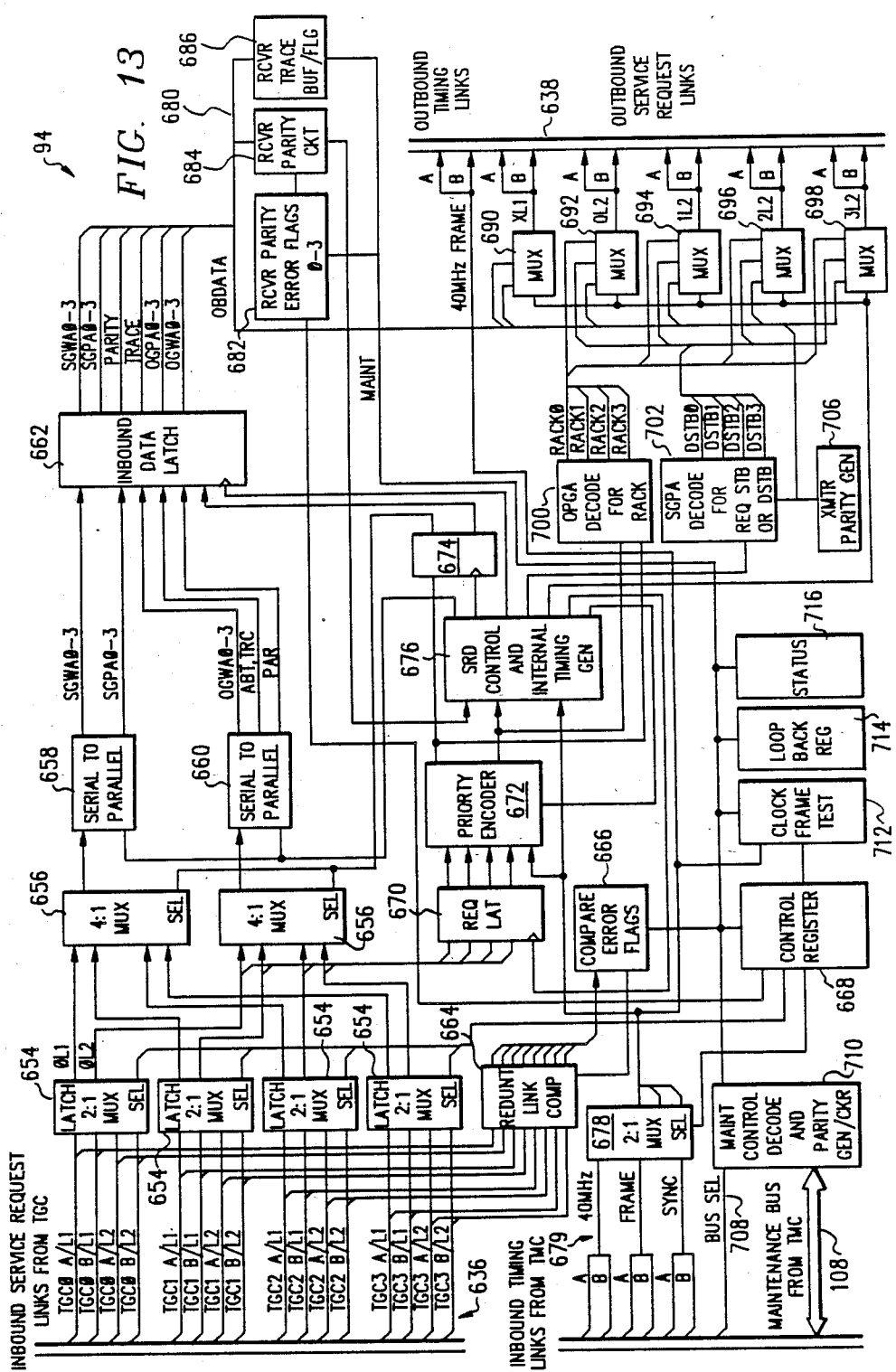
FIG. 13 illustrates a block diagram of the service request distributor subsystem.

The SRD 94 is illustrated in the block diagram of FIG. 13. The SRD 94 receives signals from the inbound service request links 636 from the four TGCs 88. The inbound service request links 636 comprise two lines for each of the A and B copies of the TGC 88. Four 2:1 multiplexers 654 are connected to the inbound service request links 636 to select either the A or B copy from each TGC 88. The outputs of the 2:1 multiplexers 654 are connected to two 4:1 multiplexers 656 which select one of the four TGCs 88. The output of each 4:1 multiplexer 656 is connected to a corresponding serial-to-parallel converter 658 and 660. The outputs of the serial-to-parallel converters are connected to an inbound data latch 662.

The sixteen lines of the inbound service request links 636 are also connected to a redundant link comparitor 664. The output of the redundant link comparitor 664 is connected to a compare error flag register 666. The control register 668 is connected to the select port of the 2:1 multiplexers 654.

The output of the 2:1 multiplexers 654 is also received by a request latch 670 whose output is connected to a priority encoder 672. One output of the priority encoder 672 is connected to an originating group address decoder 700 and to a latch 674 which is connected to an inbound data latch 662 and to the select ports of the 4:1 multiplexer 656. A second output of the priority encoder 672 is also connected to an originator group address decoder 700 and a control and internal timing generator 676. The output of the control and internal timing generator 676 is connected to the latch 674, to the inbound data latch 662, to the priority encoder 672, to the server group address decode 702, to a request latch 670, and to the serial-to-parallel converters 658 and 660. An output of the control and internal timing generator 676 is also connected to the output multiplexers 690–698. The control and internal timing generator 676 receives timing inputs from a 2:1 multiplexer 678 which selects between A and B copies of timing signal buses 679 from the TMC 102, including a 40 MHz signal, frame signal, and a synchronizing signal. The output of the 2:1 multiplexer 678 is also sent to the timing generator 634 of the TGC 88 as illustrated in FIG. 12. The output of the 2:1 multiplexer 678 is also connected to the priority encoder 672 and to a clock/frame test circuit 712. The select port of the 2:1 multiplexer 678 is connected to the control register 668.

The inbound data latch 662 is connected to a outbound data bus 680, having dedicated lines for a serving GWY address, a serving GWY group address, a parity flag, a trace flag, an originating GWY group address and an originating GWY address. The outbound data bus 680 is connected to a parity circuit 684 and a trace buffer 686. The parity error buffer 682 is also connected to the parity circuit 684, and the control register 668. The parity circuit 684 is connected to the control and internal timing generator 676. The outbound data bus 680 also is connected to multiplexers 690, 692, 694, 696 and 698. The multiplexers 692, 694, 696, and 698 also receive outputs from the originating group address decoder 700 and the server group address decoder 702.

The outbound data bus 680 is connected to the server group address decoder 702 and to a parity generator 706. The maintenance link 108, including bus select line 708, are connected to a maintenance control decoder and parity generator/checker 710. The maintenance control decoder 710 is connected to the control register 668, a clock/frame test circuit 712, a loop-back register 714, a status register 716, the parity error buffer 682, the compare error flag 666, and the trace buffer 686.

The SRD 94 is also connected to the TGC 88 through outbound service request links 638. The outbound service request links comprise the output of the multiplexers 690-698.

In operation, the SRD 94 receives inbound service requests from the four TGCs 88 over inbound service request links 636. The SRD transmits outbound service requests to TGCs 88 associated with server GWYs over outbound service request links 638. Service requests are routed through the SRDs 94 even in the circumstance when the server and originator GWYs are within the same TGC group. The SRD 94 is duplicated in A and B copies, and the interconnections between the SRD pair and the TGC pairs are cross-connected.

The SRD 94 receives inbound service requests on the inbound service request link 636 and forwards the request to the outbound service request links 638 for transmittal to the TGC 88 associated with the server GWY. The 2:1 multiplexers 654 select from the inbound service request links 636 of the A and B copies of the four TGC 88. The select ports of the multiplexers 654 are operably controlled by the TMC 102 which accesses the SRD 94 via the maintenance control decoder 710. Through the maintenance control decoder 710, the TMC 102 monitors the error flag register 666, which receives input from the redundant link comparator 664. The redundant link comparator 664 compares data received from the A and B copies of the incoming service request links from each TGC 88.

Based on the error flags present in the error flag register 666 and the parity error flag register 682, the TMC 102 determines whether the A or B copies of the inbound service links will be used for each TGC 88.

The priority encoder 672 resolves simultaneous contentions for the SRD 94 by the TGCs 88. Contention for the receiver due to simultaneous requests is resolved on a rotating priority basis, similar to the priority determination of the TGC 88, described in connection with FIG. 12. The request strobes on the inbound links are latched and presented to the priority encoder 672. The TGC 88 accepted on one cycle by the priority encoder 672 becomes the lowest priority on the next 400 nanosecond request cycle. In addition to selecting the request to be processed, the priority encoder determines the originator group address, which it transmits to the originating group address decoder 700. In response, the originating group address decoder 700 generates a request acknowledgment which is transmitter to the TGC 88 associated with the originating GWY.

Data on the service link 636 selected by the priority encoder 672 is gated to serial-to-parallel converters 658 and 660 through multiplexers 656. The received data includes the server GWY address, the server group address, the originating GWY address, a trace indicator and a parity flag. The data is transferred to the inbound data latch 662 and a service request strobe is generated by the server group address decoder 702 to the TGC 88 associated with the server GWY 82. If a service request contains a trace indicator, the data received in the request is loaded into the trace buffer 686 and trace flag is set. The trace indicator is also passed to the outbound service request link 638. Trace indicators and parity flags are available to the TMC 102 via the maintenance control decoder 710.

The server group address stored in the inbound latch 662 is used by the server group address decoder 702 to determine the outbound link 638 to which the request is to be sent. The originating GWY address, originating group address, server GWY address, trace indicator, and parity bit (generated over the address field), are transmitted over the outbound link selected by the server group address decoder 702 to the appropriate TGC 88. The outbound service request is transmitted to both copies of the server TGC pair on separate outbound service request links 638.

The SRD 94 receives 40 MHz clock signals and frame signals from both copies of the TMC 102 via the TMC maintenance link 108. The bus select line 708 is used to select the appropriate copy of the TMC 102. The active timing signals are used to time all the functions on the SRD 94, except for the maintenance control decoder 710. The active signals are also buffered and transmitted to both copies of the four TGCs 88 to provide the time base for the GWY subsystems 82.

The maintenance control decoder 710 provides the TMC 102 access to the SRD 94 via the TMC maintenance links 108. The TMC 102 controls the plane selection, tracing, and timing selections of the SRDs 94 and monitors the parity flags from the parity error flag buffer 682, the trace buffer 686, the compare error flag register 666, and the configuration status through the control register 668 and the maintenance control decoder 710. The maintenance control decoder 710 is connected to a bus from each TMC copy 102, but only the active TMC is capable of accessing the SRD 94. The active TMC 102 for control access may be independent of the active TMC 102 for timing distribution. The loop-back register 714 allows the active bus to be tested.

TIS Subsystem

Figure 14:
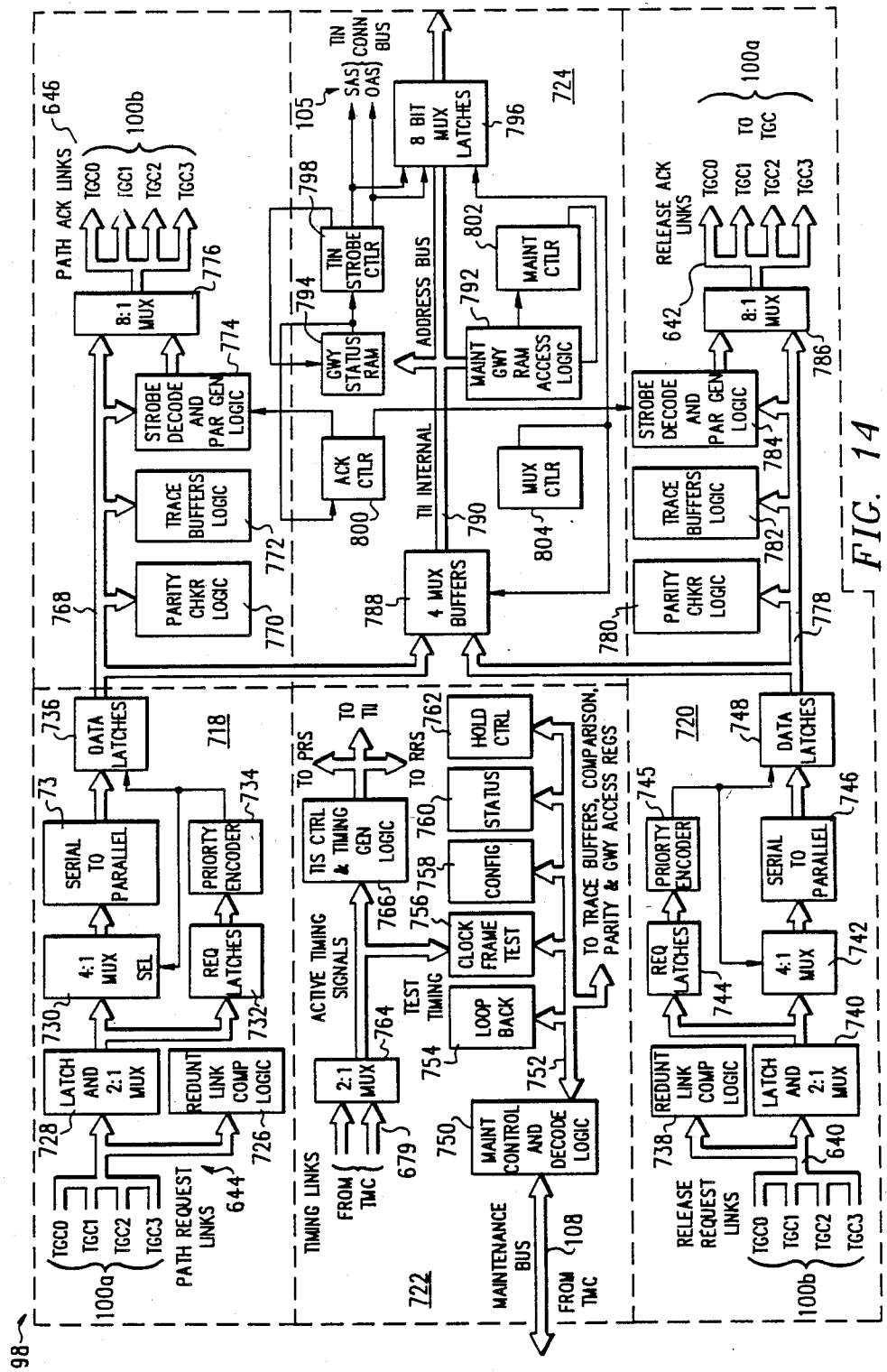
FIG. 14 illustrates a block diagram of the transport interchange supervisor subsystem.

Referring now to FIG. 14, the TIS 98 is illustrated. The TIS 98 comprises four functional sections, a path request selector block (PRS) 718, a release request selector block (RRS) 720, a maintenance interface block 722, and a transport interchange interface block (TII) 724.

The PRS 718 receives signals over the path request links 100a from the TGCs 88. Both TGC copies A and B are connected to a redundant link compare logic 726 and to a latching 2:1 multiplexer 728. The output of the multiplexer 728 is connected to a 4:1 multiplexer 730 and a request latch 732. The output of the request latch is connected to a priority encoder 734 whose output is connected to the select port of the 4:1 multiplexer 730. The output of the 4:1 multiplexer 730 is connected to a serial-to-parallel convertor 735 which is connected to a data latch 736. The output of the priority encoder 734 is also connected to data latch 736.

The data latch 736 is connected to a PRS bus 768. The PRS bus 768 is connected to a parity checker logic 770, a trace buffer logic 772, and a strobe decode and parity generator logic 774. The strobe decode and parity generator logic 774 and the PRS bus 768 also connected to an 8:1 multiplexer 776 whose outputs are connected to the path acknowledge links 646 of the four TGCs 88.

The release request selector block 720 receives the release request links 100b from both copies of the four TGCs 88. The design of the release request selector block 720 mirrors the construction of the path request selector block 718, having a redundancy link compare logic 738, a latching 2:1 multiplexer 740, a 4:1 multiplexer 742, a request latch 744, a priority encoder 745, a serial-to-parallel convertor 746, and a data latch 748.

The data latch 748 is connected to a RRS bus 778 which is connected to parity checker logic 780, trace buffer logic 782, strobe decode and parity generator logic 784, and a 8:1 multiplexer 786. The 8:1 multiplexer 786 is connected to the release acknowledge links 642 of the four TGCs 88.

The maintenance interface block 722 receives the maintenance bus 108 from the TMC 102. The maintenance bus 108 is connected to a maintenance control and decode logic 750, which is connected to a internal maintenance bus 752. The internal maintenance bus 752 is connected to a loop-back register 754, a clock frame test register 756, a configuration register 758, a status register 760, and a hold control register 762. The maintenance interface block 722 also interfaces with the timing buses 679 from the TMC 102. The copies of the timing buses 679 are passed through a 2:1 multiplexer 764 to a TIS control and timing generator 766 and to the clock frame test register 756. The output of the control and timing generator 766 is connected to various elements of the PRS 718, RRS 720, and TII 724.

The PRS bus 768 and the RRS bus 778 are connected to a multiplexer buffer 788 providing access to the TII internal address bus 790. The TII internal address bus is connected to a maintenance GWY RAM access logic 792, a GWY status RAM 794 and a latch multiplexer 796. The GWY status RAM 794 is connected to a TIN strobe controller 798 and an acknowledge controller 800. The acknowledge controller 800 is connected to the strobe decode and parity generator logics 774 and 784 of the PRS 718 and the RRS 720, respectively. The output of the TIN strobe controller 798 is connected to the TIN connection control bus 111 and to the latch multiplexer 796. The maintenance GWY RAM access logic 792 is connected to a maintenance controller 802. A multiplexer controller 804 is connected to the multiplexer buffer 788 and to the latch multiplexer 796.

The TIS 98 resides between the four TGCs 88 and the TIN 106. The TIS 98 handles three distinct hardware functions provided by the PRS 718, the RRS 720 and the TII 724. The TIS 98 also includes a maintenance interface 722.

The TIS is controlled and monitored by the TMC 102 via the TIS maintenance interface 722. Maintenance bus 108 is connected to the TIS 98 from both TMC copies. The maintenance interface 722 is similar to that described for the SRD 94 in connection with FIG. 13. The TMC 102 has access to the trace buffers 772, comparison logic 726, GWY RAM access logic 792, GWY status RAM 794, and parity logic 770.

The TMC 102 may gain access to the GWY status RAM 794 in two modes. In the first mode, for synchronous request processing, the TMC 102 is allow synchronized access to the RAM once every 400 nsec. cycle. In the asynchronous second mode, for initialization and recovery, a request hold is transmitted to all four TGCs 88 to temporarily suspend all requests for service: service request, path requests and release requests. The TMC 102 has immediate access to the status RAM 794 in the second mode.

The TMC 102 controls the selection of the request links 640 and 644 and monitors the status flags in the status register 760, including parity error, comparison error, trace selection, and timing selection, via the maintenance interface 722.

Timing control for the TIS 98 is derived from 40 MHz clock and frame signals received from the TMC 102 via TMC timing buses 679. Timing signals are received from both TMC copies, and a timing select bit set by the active TMC 102 is used to select the active timing signals. Control and status functions performed through the maintenance interface 722 are not dependent upon the system time base, except for access to the GWY status RAM 794.

The PRS 718 and the RRS 720 act similar to the priority encoder portion of the SRD 94. Based on the results of the redundant link comparitor logic 726 and 738 and parity monitoring, the TMC 102 chooses either an A or B copy of the TGC path request links 644 for each TGC 88. The TMC 102 selects the desired copy using the latching 2:1 multiplexer 728. Requests from the four TGCs 88 are stored in the request latches 732 and 744. If multiple requests are made in a given cycle, the associated priority encoder 734 or 745 chooses which request will be processed during this cycle. The priority encoder 734 or 745 selects a TGC 88 using the 4:1 multiplexer 730 or 742. The serial data received from the request links 644 and 640 is transferred from serial-to-parallel in the serial-to-parallel convertor 735 and 746. The parallel data is stored in the data latches 736 and 748.

The TII 724 is responsible for connecting and releasing paths through the TIN 106. The TII receives path requests, connects the requested paths if the request is honored, and acknowledges the path request. The TII 724 also receives release requests, and acknowledges the release requests. The TII 724 maintains the status of each GWY 82 in the GWY status RAM 794. Each GWY 82 has a location in the GWY status RAM 794. By loading a logical "1" into locations corresponding to busy GWYs 82 and clearing locations of idle GWYs 82, the status of any particular GWY 82 can be quickly determined or changed.

Path request and release request are presented to the TII 724 by the PRS 718 and the RRS 720, respectively. The server and originator GWY addresses associated with a connection are presented with each path request and release request.

For path request, the TII 724 must determine that no connection is currently active for either of the GWYs 82 involved. If both GWYs are inactive, the TII transmits the address of the two GWYs 82 to the TIN 106 and transmits an acknowledgment to the PRS 718 with the GWY BUSY signal not set. The GWYs 82 are then marked busy in the GWY status RAM 794. The GWY status RAM has an address location for each GWY 82 in the system. The data stored at each location indicates whether the associated GWY 82 is busy. If either the originator or server GWY is busy, the addresses are not transmitted to the TIN 106 and an acknowledgment is sent to the PRS 718 with the GWY BUSY signal set. In this situation, the state of the GWY status RAM 794 is left intact.

For a release request, the TII 724 changes the GWY status RAM 794 to indicate that the associated GWYs are idle. There is no validation required for these transactions, since level one protocol always allows releases. The TII 724 transmits an acknowledgment to the RRS 720.

The TII 724 is capable of resolving one request of each type, path and release, every 400 nsec., or 2.5 million requests per second. Each 400 nsec. request cycle is divided into three phases: path requests, release requests and maintenance access phases.

The path request signal is sampled at the beginning path request phase, and if it is not true, no action is taken, If the path request signal is true and the path request abort signal is not true, then the path request cycle is initiated. The abort signal is comprised of the checked link parity and the abort bit received from the PRS receiver 718.

Similarly, the release request signal is sampled at the beginning of the release request phase, with a release request cycle initiated if the signal is true and the release request abort signal is not true. Otherwise, no action is taken for the release phase.

The maintenance access phase samples the TMC 102 for reads and/or writes to the GWY status RAM 794 and response accordingly to the access being requested.

Figure 14A:
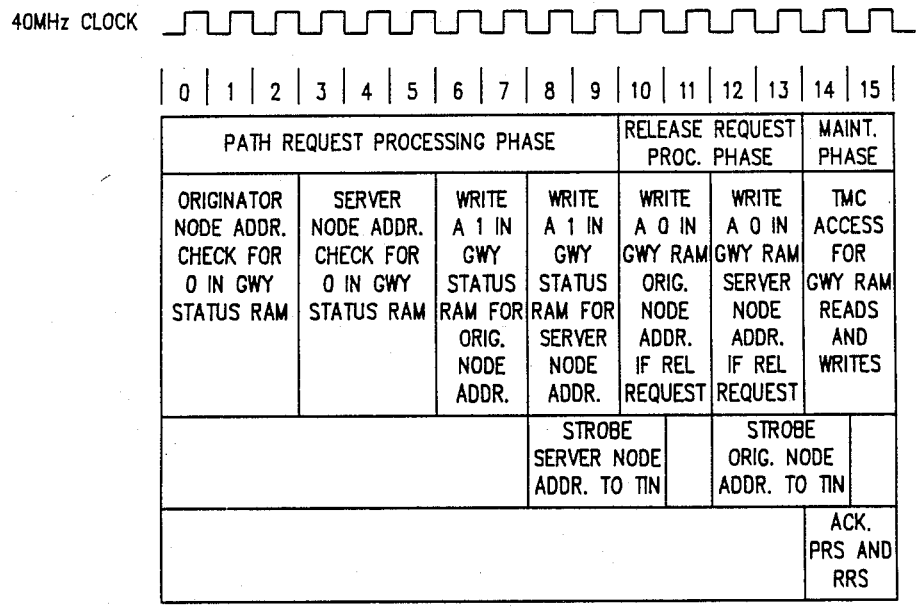
FIG. 14a illustrates a phase diagram showing phases for path requests, release requests and maintenance requests issued by the transport interchange supervisor subsystem.

FIG. 14a illustrates a phase diagram showing the preferred phases for each, assuming that all three requests, path, release and maintenance, are pending.

During the path request phase the originator GWY address is gated to the GWY status RAM 794 and the status of the originator GWY for the path request is read from the GWY status RAM 794 to determine whether the originating GWY is busy. Next, the server GWY address is gated to the GWY status RAM 794, and the status of the server GWY for the path request is read to determine whether it is busy. If the GWY status RAM 794 indicates that either GWY 82 is busy, the path acknowledge signal is sent to the PRS 718 with the GWY BUSY signal set and the path request cycle is terminated. On the other hand, if both GWYs are idle, the path acknowledge signal is sent to the PRS 718 with the GWY BUSY not sent and the path request cycle is continued.

When the PRS 718 receives a path request from one of the TGCs 88 on the path request links 102a, it returns a request acknowledge to the requesting TGC and presents a path request to the TII 724. The TII responds with a path acknowledgment with a GWY busy signal indicating if the request was honored. The PRS 718 then sends a path acknowledgment to both the originator and the server GWY via the path acknowledgment links 646 of the path request links 100a. The acknowledgment contains a signal (ACK/NACK) indicating whether or not the path was connected. The group address of the requesting TGC is defined by the priority encoder 734.

The data converted by the serial-to-parallel converter 735 is presented to the TII 724 and includes the server GWY address, the originator GWY address, the originator group address, and a trace indicator. When the trace indicator is set in a receive path request, the data in the receiver address data latch 736 is loaded into the trace buffer logic 772 and a "trace complete" flag is set. A trace indicator is also sent to the TII 724 and the PRS 718 such that the subsequent path acknowledgment transmitted by the PRS 718 to the GWYs 82 will have a trace indicator set, thus propagating the trace through additional protocol phases.

Parity and comparison testing are also supported by the PRS 718. Data received on the redundant links is compared, with a flag set for errors. The parity bit received on the links is tested, with an appropriate flag set for errors.

When the TII 724 acts on a path request from the PRS 718, it returns a path acknowledge to the PRS 718 with a GWY BUSY signal indicating the status of the request. The path acknowledge from the TII 724 starts a path acknowledgment cycle from the PRS 718 to the originator and server GWYs over the path acknowledgment links 646 The GWY BUSY signals is passed to the GWYs with the acknowledge used to indicate whether the request was honored.

The path acknowledgment from the TII causes the GWY and group addresses of the server to be loaded into the strobe decode and parity generator logic 774. The server and originator group addresses are decoded by the strobe decode 774 to select the path acknowledge link 646 on which the path acknowledgment is to be transmitted. The server and originator GWY addresses are transmitted on the acknowledge links for all four TGCs.

Figure 14B:
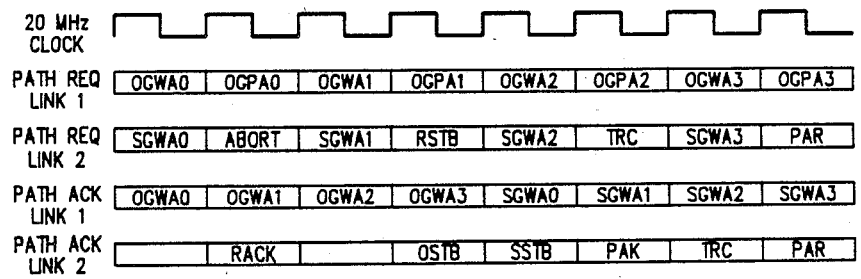
FIG. 14b illustrates the format for a path request link and path acknowledge link.

The signals transmitted on the path request links 64 and path acknowledge link 646 are shown in FIG. 14b. The path request links 644 transmit four bit codes for the originator gateway address (OGWAO-3) and originator group address (OGPAO-3) over a first link. The server gateway address (SGWAO-3) is transmitted over a second link along with an abort flag (ABORT), a request strobe (RSTB), a trace indicator (TRC), and a parity bit (PAR). The request strobe is a look-ahead request for a pending request in the TGC 88.

The path acknowledge links 646 transmit originator and server gateway addresses on a first link and a request acknowledge (RACK), originator strobe (OSTB), a server strobe (SSTB), and a positive acknowledge (PAK) on a second link, along with a trace indicator and a parity bit.

The request acknowledge is generated in response to a RSTB signal on the associated request link, and indicates that a new request may be transmitted. The originator strobe indicates that the field in which it is presented contains an originator acknowledgment. The server strobe indicates the same for a server acknowledgment. One field may contain both an originator and server acknowledgment if the originator and server gateways are in the same group. The positive acknowledgment applies to path acknowledgments. If PAK is true, the associated transaction contains a positive acknowledgment.

The RRS 720 acts substantially the same as the PRS 718; however, the GWY BUSY signal is not defined in the interface between the RRS 720 and TII 724. Also, the corresponding GWY busy signal to the GWYs is not defined for the RRS 720.

If the path request cycle is continued, the originator GWY address is gated to the GWY status RAM 794 and the originator GWY is marked busy. The server GWY address is also gated to the GWY status RAM and the server GWY is also marked busy. Subsequently, the server and originator GWY addresses are transmitted to the TIN 106 to setup the path therebetween.

If a trace indicated is received with the path request data, and the request has been honored, the trace indicator is passed along with the GWY address to the TIN 106. A parity bit is generated across the GWY addresses transmitted to the TIN.

In the release request phase, the originator GWY address associated with the release request is gated to the GWY status RAM 794 and the originator GWY is marked idle. Also, the server GWY address associated with the release request is gated to the GWY status RAM and the server GWY is marked idle. A release acknowledge signal is sent to the RRS 720, indicating that the release was performed.

In the maintenance access phase, the GWY address to which the TMC desires access is gated to the GWY status RAM 794, and the read or write operation is performed. For a read operation, the subsequent TMC read cycle indicates the status of the GWY status RAM 794 along with the GWY address. The maintenance access interface to the GWY status RAM has the capability to monitor one particular GWY address in the synchronous mode or monitor the entire GWY status RAM 794 in a contiguous manner with consecutive read operations in the asynchronous mode.

For a write operation, the modification of the GWY status RAM is performed instantly when operating in the asynchronous mode. The same capability for single or contiguous access described for read operations is available for write operations.

TMC Subsystem

Figure 15:
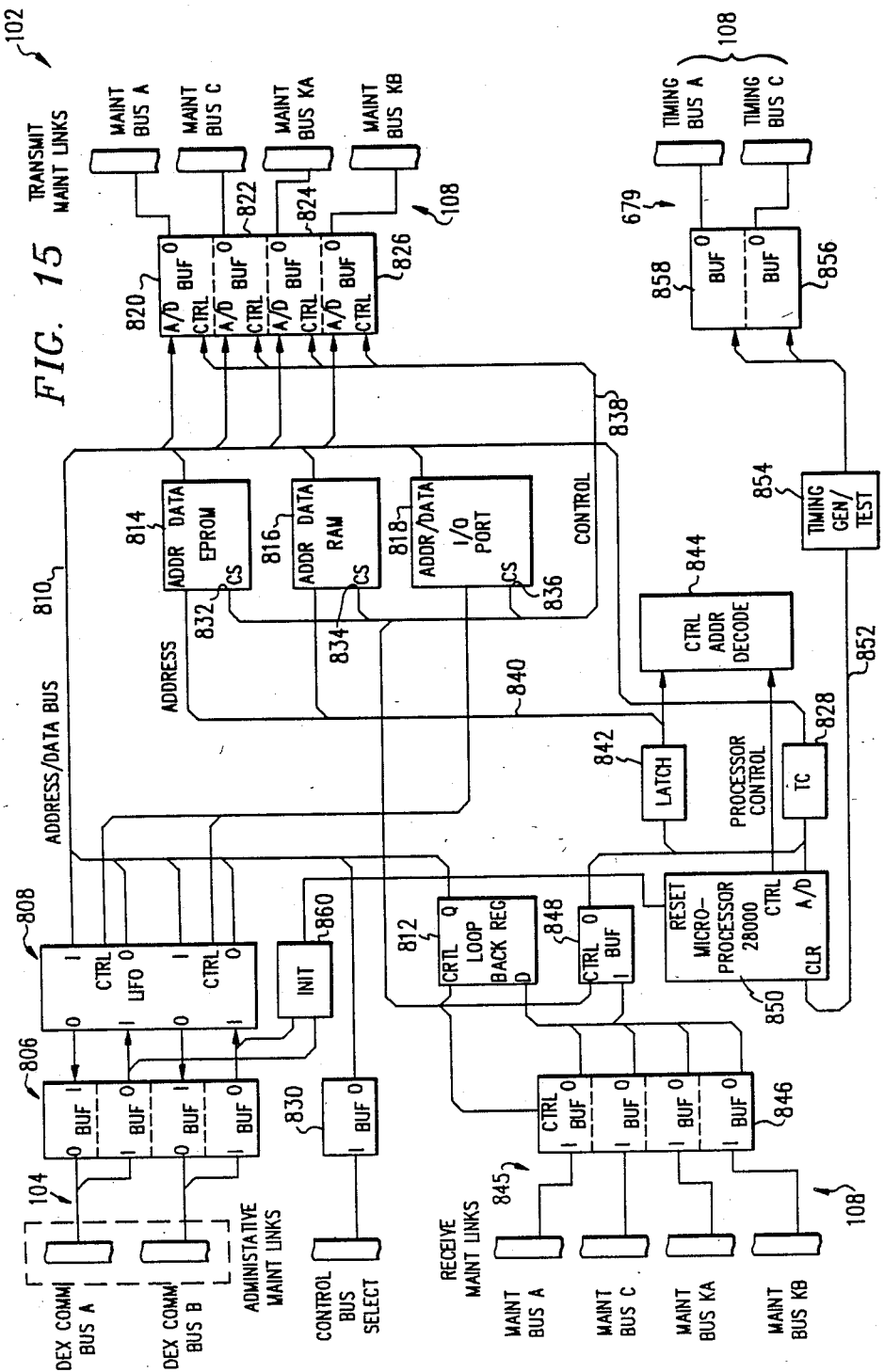
FIG. 15 illustrates a block diagram of the transport maintenance controller subsystem.

Referring now to FIG. 15, the TMC 102 is illustrated. The TMC 102 is connected to the administrative maintenance link 104, having A and B copies. The administrative maintenance link 104 is connected to a bidirectional buffer 806 which operably connects the administrative maintenance 104 with a lifo 808. The lifo 808 is connected to an address/data bus 810, which is also connected to a loop-back register 812, control bus select buffer 830, EPROMS 814 and RAM 816 to the address/data port of the 1/0 port 818, to the address/data ports of maintenance bus buffers 820, 822, 824 and 826, and to a transceiver 828. The control bus select from the duplicate TMC copy is connected to an I/O buffer 830. The output of the control address decoder 844 is connected to the control ports of the buffers 820–826, to the CS ports 832, 834 and 836 of the EPROM 814, RAM 816, and I/O port 818, respectively, and to the control ports of the loopback register 812, I/O buffers 846 and buffer 848. An address bus 840 is connected to a latch 842, a control address decoder 844, the RAM 816 and the EPROM 814.

The receive portion 845 of the maintenance links, bus A, bus C, bus KA and bus KB, are connected to an I/O buffer 846. The outputs of the buffer 846 are also connected to the data port of the loop-back register 812 and to the input port of the buffer 848. A microprocessor 850 has a clock register connected to a timing generator/tester circuit 854. The output of the timing generator/tester circuit 854 is connected to buffers 856 and 858 which are connected to timing bus A and timing bus C of timing links 679.

The address/data port of the microprocessor 850 is connected to the buffer 848, transceiver 828 and latch 842. The control port of the microprocessor 850 is connected to the control address decoder 844. The reset port of the microprocessor 850 is connected to an initialization register 860. The initialization register is also connected to the bidirectional buffer 806.

The buffers 820 and 822 are connected to the transmit portion 861 of the maintenance bus 108, buses A and C, and buffers 824 and 826 are connected to the transmit portion of the maintenance bus 108, buses KA and KB.

The TMC 102 uses a EPROM based microprocessor, preferably a Zilog Z8000 microprocessor, having a 128K byte memory space. The TMC 102 communicates with the system maintenance processor 76 over the administration maintenance link 104.

The transmit maintenance bus A is connected to the TIC backplane of the maintenance links 108 in which the TMC copy 102 resides. The transmit maintenance bus C is connected to the backplane in which the duplicate TMC copy 102 resides. Transmit maintenance bus KA is connected to the A copy of TGC 88 and transmit maintenance bus KB is connected to the B copy of the TGC.

Similarly, receive maintenance buses A and C are cross-connected with the duplicate TIC backplane of the maintenance links 108. Receive maintenance buses KA and KB are cross-connected with the TGC copies.

Timing buses A and C are also cross-connected with the TIC backplane.

In operation, the TMC 102 provides the timing generation, timing tests and maintenance shell communications within the MTN 10. For configuration and testing, the TMC 102 receives messages over the administration maintenance link 104 and distributes the messages over the maintenance shell to the TNCs 78 and the TGCs 88. The TMC also receives fault reports from the TNC 78 and TGCs 88 for communication with the system maintenance processor 76.

All subsystems in the MTN 10 are accessible by the TMC 102 without the use of the buses used for packet transport. This creates a communication shell which operates independently of all control and data paths and timing related to the connection control and packet transport mechanisms, providing a means for configuration and fault isolation without interruption of switching operations.

The time base for the MTN 10 is provided by the TMC 102. The TMC 102 provides a 40 MHz clock and a 25 nanosecond pulse every two microseconds as a frame signal to each of the redundant boards within the TIC 86.

The TMC 102 serves as a means of exchange across a path independent of the MTN 10 connection control and packet transport logic. A redundant TMC assumes control in the case of failure of the operating TMC 102. The two TMCs reside on separate backplanes to isolate failures.

In the case failed communication between the TMC 102 and any of the subsystems on the maintenance links 108, the TMC 102 may attempt to isolate the faulty subsystem in one of several ways. If the addressed subsystem is suspect, the TMC 102 will direct a communication to its own loopback register 812. This allows test patterns to be written across the TMC transmit links 861, maintenance bus 108, and receive links 845, thereby exercising all aspects of the TMC 102 and maintenance bus 108 sides of the communication. By doing so, the TMC 102 can eliminate itself and the maintenance bus 108 as being faulty.

Parity is sent with all addresses and data initiated by the TMC 102. A parity check is performed by subordinate subsystems on all data received from the TMC 102. Registers residing on each subsystem are polled periodically to determine whether a parity error has occurred. The TMC 102 is also equipped to force parity errors with the transmission of address and data. The TMC 102 may also inject a parity error into its own receiver.

The TMC processing control is provided by a microprocessor 850, preferably a Zilog Z8002 microprocessor. The Zilog Z8002 is a 16-bit unit which can address 64K bytes of I/O space and up to 128K bytes of memory space. Each TMC 102 contains 64K bytes of ROM 814 and 64K bytes of RAM 816. Subsystems are addressed through I/O ports 818. The I/O unit 818 is used to control data transfer and status information on the administration maintenance link 104 and to select the active channel bus.

TIN Subsystem

Figure 16:
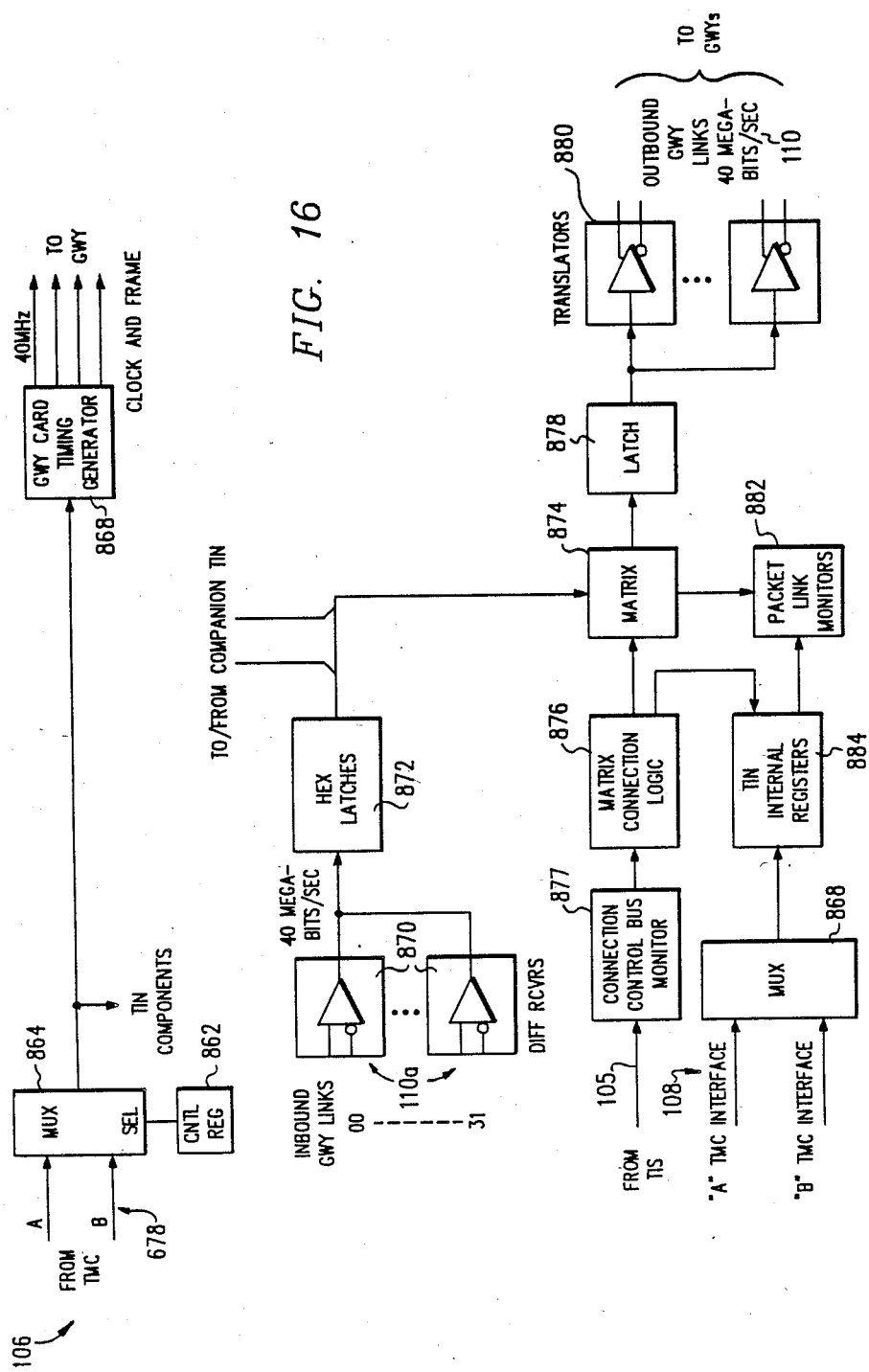
FIG. 16 illustrates a block diagram of the transport interchange subsystem.

Referring now to FIG. 16, a block diagram of the TIN 106 is illustrated. The TIN 106 receives A and B copies of the timing bus 679 from the TMC 102. The active timing signal is selected by a control register 862 and a multiplexer 864. The active timing signal is transmitted to the GWYs 82 through the GWY timing generator 868. The GWY card timing generator distributes 40 MHz clocks to the GWYs for recovering and transmitting data.

The first thirty-two GWYs (0-31) are connected to differential receivers 870 of the first TIN card via the inbound packet transport links 110a. The outputs of the differential receivers 870 are connected to hex latches 872. The hex latches 872 are connected to a matrix along with the output of the hex latch from the second TIN, which handles the second thirty-two GWY links (32-63). The matrix 874 also receives data from the TIS 98 over the connection bus 111, through the matrix connection logic 876 nd the connection control bus monitor 877. The matrix 874 provides a connection to the outbound GWY links 110a of the packet transport 110 through latch 878 and differential translators 880. The matrix 874 is also connected to a packet link monitor 882, which is connected to the TIN internal registers 884. The TIN internal registers 884 receive input from the matrix connection logic 876 and from the A and B copies of the TMC 102 through a multiplexer 868.

The TIN 106 comprises two TIN cards, one of which is shown in FIG. 16. The subsystem card providing a 64×64 cross-point matrix, with each card providing a 64×32 Each TIN half supports thirty-two GWY cards for switching packet data. Control for the matrix connections is provided by the TIS 98 via the connection control bus 111. Each TIN half is connected to both copies of the TMC 102 via the TMC maintenance buses 108 to permit the TMC 102 access to the TIN internal registers 884. Each TIN half is connected to the inbound packet links and outbound packet links for thirty-two GWY cards.

Data arriving on the inbound links 110a is presented to the matrix 874 on the card receiving the data and is transmitted to the other TIN half as well. The data received from both TIN halves is presented to the matrix on each card. The matrix is capable of switching any of the sixty-four inbound links 110a associated with the two TIN halves to any of its own compliment of thirty-two outbound links 110b under the control of the matrix connection logic 876.

When a connection is required between a server GWY and an originating GWY, the server GWY is connected to the originating GWY on a two-way path provided by the matrix connection logic 876. The address of the originating GWY and the server GWY are transmitted on the connection control bus 111 by the TIS 98. The two addresses are loaded into registers in the matrix connection logic 876, which illustrates a connection cycle.

The two connections required for each transaction (server to originator and originator to server) are accomplished in two phases. The TIN half whose outbound links are associated with the originating GWY uses the address of the server GWY and the low order five bits of the address of the originating GWY to load the control latches in the matrix to make the desired connection. In the second phase, the same procedure is performed with the roles of the two GWY addresses reversed.

Each TIN half supports parity and trace monitoring for the packet links. Data being received from the inbound packet links 110a may be connected to a packet link monitor. The link selected to be monitored is selected by the TMC 102. When a parity error is detected, a parity error flag is set in the packet link monitor 882. A first byte of the header of each packet transported through the TIN contains a trace indicator bit. When the trace indicator is set for a packet on a link which has been selected for monitoring, trace cycle is initiated for the packet. The monitor generates a longitudinal redundancy code for the packet, loads the results on a trace buffer, and sets a trace complete flag indicating that the buffer has been loaded.

A parity bit is transmitted on the connection control bus 111 with each GWY address by the TIS 98. Parity detection logic on the TIN 106 tests the received parity and sets a control bus parity error flag in the connection control bus monitor 877 when an error is detected. A trace indicator signal is also available on the connection control bus 111. When the trace signal is set for bus cycle, both GWY addresses, parity bits, and trace signal transmitted in that cycle are loaded into trace buffers on both TIN halves. A "trace complete" flag is set to indicate that the buffer has been loaded.

A connection error bit is also available in the status register of the connection control bus monitor 877. This bit indicates that one or the other TIS bus strobes were received, but not both.

Maintenance Shell Overview

Figure 17:
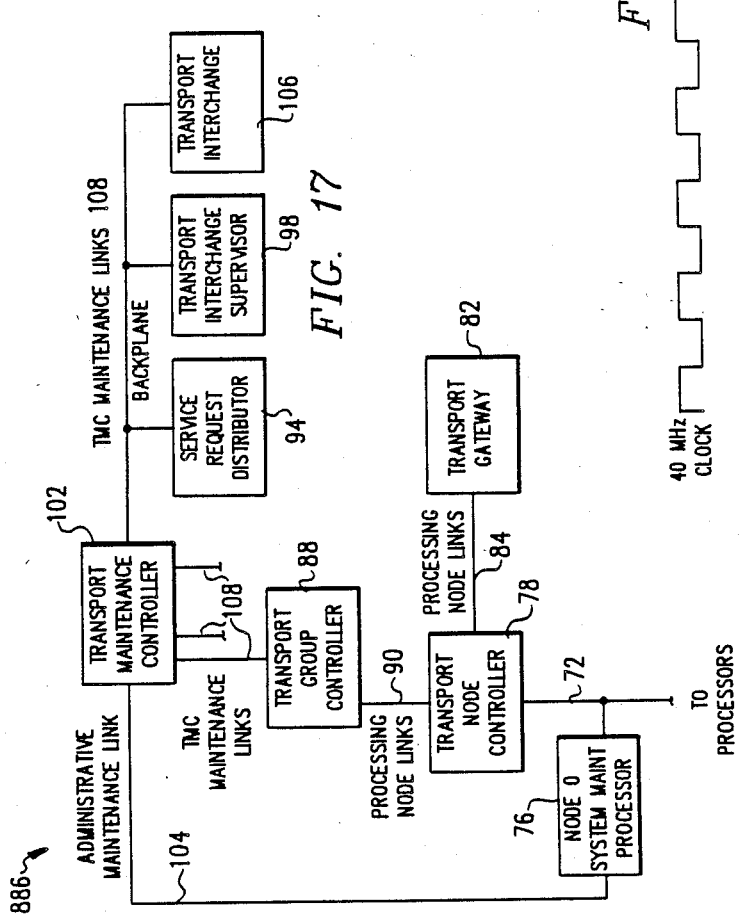
FIG. 17 illustrates an overview of the maintenance shell.

FIG. 17 illustrates an overview of the maintenance shell 886. The TMC 102 is connected to the system maintenance processor pair 76 over an administration maintenance link 104. The TMC 102 is further connected to the SRD 94, TIS 98, and TIN 106 over the TMC maintenance links 108. The TMC maintenance links 108 also connect the TMC 102 to the TGC 88. The TGC 88 is connected to the TNC 78 via the processing node maintenance links 90. The system maintenance processor 76 and other processors 72 are connected to the TNC 78 by the first cluster bus 74. The GWY 82 is connected to the TNC by the processing node links 84.

The maintenance shell provides initialization fault detection, fault isolation and configuration of the MTN 10. The maintenance shell 886 operates independently of the level one and level two hardware and is designed to provide "windows" into the operation of the connection control and packet transport hardware.

Several mechanisms are provided for fault detection in the MTN 10. Parity error detection and comparison error logic are provided for each transmission link between the various card level subsystems and transaction time-out are provided at the processing node interfaces. Comparison logic is provided at the receivers of duplicated links. For example, comparison logic is provided on the SRDs 94 for comparing the data received from a pair of TGC copies 88. The parity and comparison detection logic is monitored via the maintenance shell 886. Once an error is detected by one of the detection mechanisms, a transaction trace facility is invoked to isolate the fault causing the error to a replaceable unit. A processing node initiates a transaction trace by setting a trace indicator defined in the level one and level two protocols. Trace buffers are provided on each subsystem in the MTN 10 and these buffers are loaded with appropriate information regarding the transaction being traced. After the trace transaction has completed, the trace buffers are interrogated via the maintenance shell 886 to determine where the transaction failed.

The maintenance shell 886 is composed of a hierarchical processor structure with the processors linked together by dedicated maintenance links. The system maintenance processor 76 is at the top of the hierarchy and it communicates with the subsystems in the MTN through the TMC 102 in the MTN. The TMC directly monitors and controls the maintenance related logic on the SRD 94, TIS 98, and TIN 106 subsystems. The next layer in the hierarchy below the TMC 102 is the maintenance portion of the TGC 88. The processor based maintenance logic on the TGC controls and monitors the other maintenance functions on the TGC and acts as a tandem distribution point for maintenance messages transmitted between the TMC 102 and the sixteen processing nodes associated with the TGC 88.

All the elements in the maintenance shell 886 are duplicated and cross-coupled communication links are provided between the elements.

The TMC 102 is subordinate to the system maintenance processor 76 in the maintenance control. The TMC 102 is super-ordinate to the TGC 88 within the shell. System maintenance processor messages originating or terminating in the TGC 88 or in the TNCs 78 below the TGCs are passed through the TMC 102.

Timing Islands

FIG. 18 illustrates the use of "timing islands" in the MTN 10. The TMCs 102 supply a 40-MHz clock and a framing signal to the SRD 94, TIS 98, and TIN 106, with each copy of the TMC 102 supplying a separate clock signal. The SRD copies supply 40 MHz clock and framing signals to the TGC 88, each copy of the SRD 94 supplying a signal to each copy of the TGC 88. The GWYs 82 receive timing signals from each copy of the TGC 88 associated with the GWY and from each copy of the TIN 106. The TNC 78 receive timing signals from the GWYs 82.

The timebase for the MTN 10 is a 40 MHz clock and a 500 KHz synchronization signal for framing. The timebase is generated by the TMC 102 and distributed throughout the system, except for the timing signals between the GWYs 82 and the TNC 78. In order to permit lengths of up to 100 ft. for the processing node links, the transmission rates are restricted to 4 MHz.

The concept of timing islands minimizes the effects of timing skew within the MTN 10. The general approach is to resynchronize high speed signals at island boundaries at a lower rate.

Timing signals are distributed from both copies of the TMC 102 to the two TIC backplanes, i.e., both copies of the SRD 94, the TIS 98, and the TIN 106. Control of the timing signal selection is such that all the cards at this level select the timing signals from the same TMC copy. Timing for all the interconnections between cards at this level is derived from the selected timing signals. Most of the interconnections between the cards operate at a time 20 MHz rate, except for the interconnections between the two TIN cards within a TIN subsystem.

The TGC 88 receives 40 MHz clock and frame signals from the SRD 94. The TGCs 88 use the signals to recovery outbound data and to transmit data to the cards in the TIC back plane. Timing signals are distributed to the TGCs 88 from both copies of the SRD 94. The active timing signals are selected independently at the TGCs 88 under the control of the TMC 102.

The TGCs 88 distribute the 40 MHz clock and frame signal to the GWYs 82 subordinate thereto. The interconnects between the GWYs 82 and their associated TGC 88 operate at a ten megabit per second rate. The slower rate is required due to additional timing skew accumulation through the TGC 88. Both copies of the TGC 88 distribute timing signals to the GWYs 82 and the selection of the active signal is made at the GWY 82 under the control of the TNC 78.

Data is transmitted between the TIN 106 and the GWYs 82 at a data rate of 40 megabits per second. Outbound data and timing signals including 40MHz clock and frame signals are transmitted to the gateways from both copies of the TIN. One of the TIN copies is selected as the active copy and timing signals from that copy are used to generate the internal time base for the GWY packet interface. The potential skew between the timing signals transmitted to the GWYs by redundant copies of TINs is such that data from the plane cannot be received reliability using timing signals from the other plane. Data must be transmitted between a TIN and a GWY using timing signals from the TIN copy. This is accomplished by providing separate packet interfaces on the GWYs 82 for the two copies of the TIN 106. Timing signals are distributed to the two GWY packet interfaces from their respective TIN cards 106. The 40 megabit data is recovered and transmitted using the clock from the corresponding TIN 106. Outbound data is converted from serial to ten bit parallel using the clock and frame signal from the TIN. This parallel data is resynchronized with the internal time base of the GWY at the 4 MHz rate. Inbound data is synchronized with the TIN time base in the parallel domain and then converted from ten bit parallel to 40 MHz serial stream for transmission to the TIN using the TIN time base.

Timing for transfers between the GWY 82 and its associated TNC 78 is derived from the internal time base of the GWY cards. A 4 MHz clock is derived from the clock signal received from the selected TIN 106 and transmitted to the TNC 78 for recovering the 4 MHz parallel data sent from the GWYs 82. The TNC 78 derives a 4MHz transmit clock from the clock received from the GWY 82. The TNC 78 sends the transmit clock to the GWY 82 with the transmitted data. The GWY makes use of the "data here" signal on the transmit bus and a phase comparison circuit to synchronize the transmit data with its internal clock.

The architecture of the MTN is hierarchical with two major functional branches, and the branch associated with packet transport has very little interaction with the branch associated with the connection control with respect to timing. The physical constraints for the transmission links are quite different between different elements in the MTN hierarchy. These architectural considerations along with the desire to minimize complex data and timing interface techniques pointed to a hierarchical timing distribution following the general structure of the control hierarchy. Complex timing distribution techniques such as phase locked loops and synchronization buffers are costly and tend to be less reliable than the direct timing approach generally used for the MTN. Within the timing distribution hierarchy, "timing islands" are defined which are independent with respect to timing skew. Further, when interactions between peer level "timing islands" are required, the interaction between the "timing island" boundaries is accomplished at a data rate consistent with the timing skew at that point. The packet interface of the GWY is an example of an interaction between two "timing islands". The A and B TIN planes constitute two timing islands which interact at the GWY.

Within each "timing island", the data transmission and timing distribution techniques are based on the physical constraints. Factors affecting the design included the number of signals to be connected to each subsystem, the bandwidth requirements of those signals and the length of the transmission lines. For example, the number of signals to be connected between the TGCs and the SRDs and TISs is relatively low, the transmission lines are short and the bandwidth requirements are high. Signal data rates for these links is 40 megabits per second but it was found that excessive timing skew would exist for this transmission rate. Equipping two transmission lines per signal with each line operating at 20 megabits per second provides a solution which has an acceptable number of I/O pins per subsystem and meets timing skew requirements.

Although the present invention has been described in detail, it should be understood that various changes, substitutions and alterations can be made herein without departing from the spirit and scope of the invention as defined by the appended claims.

What is claimed is:

1. A switching network for providing connections between processing elements comprising:
   a plurality of interface circuits for transferring information to and from respective processing nodes coupled to one or more of the processing elements;
   request distributor circuitry operably connected to said interface circuits for transferring a request for communication from an initiating processing element to a selected processing element;
   supervisor circuitry for determining whether one of said interface circuits associated with either said initiating processing element or said selected processing element is currently capable of transferring information between said initiating and selected processing elements; and
   a circuit switch matrix for establishing a point to point connection between said initiating and selected processors in response to an appropriate signal from said supervisor circuitry.

2. The switching network of claim 1 and further comprising information control circuitry for connecting a plurality of the processing elements in parallel to a single processing node to provide communication between said plurality of processing elements and a single interface circuit.

3. The switching network of claim 2 wherein said information control circuitry include circuit to poll said plurality of processing elements to determine whether a request for connection to said interface circuitry.

4. The switching network of claim 1 an further comprising group control circuitry for transferring information between a plurality of interface circuitry and said request distributor circuit.

5. The switching network of claim 4 wherein said group control circuitry is further operable to transfer information between a plurality of interface circuitry and said supervisor circuitry.

6. The switching network of claim 1 and further comprising maintenance circuitry for monitoring the integrity of the information being transferred through the switching network.

7. The switching network of claim 6 wherein said maintenance includes circuitry to check parity flags associated with the information transferred through the switching network.

8. The switching network of claim 1 and further comprising circuitry for tracing selected information transferred through the switching network.

9. The switching network of claim 1 and further comprising clock circuit for generating timing signals to said interface circuitry request distributor circuit matrix circuit and supervisor circuitry.

10. The switching network of claim 9 wherein said timing circuit includes first timing circuit for generating timing signals to said matrix circuitry and second timing circuit associated with said matrix circuitry for generating timing signals to said interface circuitry, such that the skew between timing signals used by said matrix circuitry and the timing signals used by said interface circuitry is minimized.

11. The switching network of claim 1 wherein said circuit switch matrix is operable to provide full duplex communication between said initiating and selected processing elements.

12. The switching network of claim 1 wherein said request distributor includes a plurality of data paths with respective interface circuits separate from said circuit switch such that requests for communication do not interfere with communications between processors.

13. A switching network for providing simultaneous connection between pairs of processors comprising:
   a plurality of interface means each associated with one or more processors;
   path request means associated with said interface means for determining whether a first processor connected to first interface means has requested formation of a communication path with a second processor;
   means for determining the address of the interface means associated with said second processor;
   means for determining the status of said first interface means and of said interface means associated with said second processor to determine whether a connection between said first and second processor can be currently formed;
   means for storing said request for a communication path for later execution if the status of either interface means is such that a communication path cannot be currently formed;
   matrix means for forming a path between said first interface means and said interface means associated with said second processor; and
   means for assigning an idle status to said first interface means and said interface means associated with said second processor after the termination of communication between said first and second processors.

14. The switching network of claim 13 and further comprising means for signaling the interface means associated with said second processor to indicate that said first processor has requested a path thereto.

15. The switching network of claim 13 and further comprising means for signaling the first interface means and the interface means associated with said second processor when a connection has been formed.

16. The switching network of claim 13 wherein said path request means includes means for determining priority between simultaneous requests by a plurality of processors.

17. The switching network of claim 16 wherein said means for determining priority includes means for rotating priority, such that a processor receiving highest priority on a first cycle receives lowest priority on a subsequent cycle.

18. The switching network of claim 13 and further comprising means for transferring requests for path formation to said means for determining status.

19. The switching network of claim 18 wherein said means for transferring is connected to a plurality of said path request means and further comprising means for assigning priority for simultaneous requests from said path request means.

20. The switching network of claim 13 and further comprising means for monitoring the validity of the data path through the switching network.

21. The switching network of claim 20 and further comprising: data buses for transferring data between said matrix means and said interface means; and maintenance buses independent of said data buses for transferring maintenance information to said maintenance means.

22. The switching network of claim 13 and further comprising multiplexing means for connecting a plurality of processors to a single interface means.

23. A method for providing connections between processing elements comprising::
    determining priority between simultaneous requests for connections by a plurality of processors;
    granting a request for a communication path between a first processor which has the highest priority and which is connected to a first interface and a second processor associated with a second processor interface;
    determining the address of said second processor to which said first processor desires communication;
    storing said request for communication in a memory for later execution if a connection cannot currently be formed between said first and second processors;
    forming a point to point connection between the interfaces associated with said first and second processors if neither interface is currently busy;
    assigning a busy status to said first and second interfaces;
    transmitting data between said first and second processors; and
    assigning an idle status to said first and second interfaces after the communication between said first and second processor has completed.

24. The method of claim 23 and further comprising the step of signaling the interface circuitry associated with said second processor to indicate that said first processor has requested a path.

25. The method of claim 23 and further comprising the steps of signaling the first interface circuitry and the interface circuitry associated with said second processor when a connection has been formed.

26. The method of claim 23 and further comprising the step of rotating priority such that a processor receiving highest priority in said step of determining priority is assigned the lowest priority on a subsequent step of determining priority.

27. The method of claim 23 wherein said step of determining priority comprises the step of transferring signals from a plurality of interfaces to an associated group control circuit and prioritizing simultaneous requests from said interfaces.

28. The method of claim 23 and further comprising the step of monitoring the validity of data transferred between processors.

29. The method of claim 28 and further comprising the step of transferring maintenance information independently of data information.

30. The method of claim 23 and further comprising the step of maintaining a table of the status of each interface in a random access memory.

* * * * *

UNITED STATES PATENT AND TRADEMARK OFFICE
CERTIFICATE OF CORRECTION

PATENT NO. : 4,885,739
DATED     : December 5, 1989
INVENTOR(S) : Edgar L. Read, et al.

It is certified that error appears in the above-identified patent and that said Letters Patent is hereby corrected as shown below:

Claim 3, column 45, line 50, change "circuit" to --circuits--.

Claim 3, column 45, line 52, after "connection" insert --is present and transfers said request for connection--.

Claim 4, column 45, line 53, change "an" to --and--.

Claim 9, column 46, line 6 after "circuitry" insert --,-- and after "circuit" insert --,--.

Signed and Sealed this

Thirty-first Day of December, 1991

Attest:

HARRY F. MANBECK, JR.

Attesting Officer

Commissioner of Patents and Trademarks